United States Patent [19]

Sekiguchi

[11] Patent Number: 5,798,864
[45] Date of Patent: Aug. 25, 1998

[54] PROJECTION TYPE IMAGE DISPLAY APPARATUS

[75] Inventor: Nobutoshi Sekiguchi, Hidaka, Japan

[73] Assignee: Olympus Optical Co., Ltd., Tokyo, Japan

[21] Appl. No.: 389,590

[22] Filed: Feb. 16, 1995

[30] Foreign Application Priority Data

Mar. 24, 1994 [JP] Japan ................................ 6-053747

[51] Int. Cl.$^6$ .......................... G02B 27/46; G03H 1/08
[52] U.S. Cl. ........................ 359/559; 359/9; 349/5; 349/17
[58] Field of Search .................. 359/9, 559; 349/5, 349/7, 9, 62, 74, 117, 17, 201; 348/745; 364/413.16

[56] References Cited

U.S. PATENT DOCUMENTS

| | | |
|---|---|---|
| 4,347,508 | 8/1982 | Spooner . |
| 4,772,101 | 9/1988 | Liu . |
| 5,079,555 | 1/1992 | Turpin . |
| 5,106,179 | 4/1992 | Kamaya . |
| 5,161,042 | 11/1992 | Hamada ................................ 349/62 |
| 5,357,288 | 10/1994 | Hiroshima et al. ................... 349/7 |
| 5,483,299 | 1/1996 | Minoura ............................... 348/745 |
| 5,497,254 | 3/1996 | Amako et al. ........................ 349/74 |
| 5,515,183 | 5/1996 | Hoshimoto ........................... 359/9 |
| 5,579,161 | 11/1996 | Sekiguchi ............................. 359/559 |
| 5,589,955 | 12/1996 | Amako et al. ........................ 359/9 |

FOREIGN PATENT DOCUMENTS

| | | |
|---|---|---|
| 0 473 343 A1 | 3/1992 | European Pat. Off. . |
| 59-119982 | 7/1984 | Japan . |
| 1-124434 | 5/1989 | Japan . |
| 2-136818 | 5/1990 | Japan . |
| 3-51167 | 8/1991 | Japan . |
| 3-214872 | 9/1991 | Japan . |
| WO 84/00831 | 3/1984 | WIPO . |

OTHER PUBLICATIONS

Patent Abstracts of Japan, vol. 15, No. 309 (P–1235) Aug. 7, 1991 & JP–A–03 110 592 (Casio) May 10, 1991.
Patent Abstracts of Japan, vol. 14, No. 369 (P–1090) Aug. 9, 1990 & JP–A–02 136 818 (Sony) May 25, 1990.
SPIE Display System Optics, vol. 778, 1987, pp. 70–78, M. Shenker, "Optical Design Criteria for Binocular Helmet-Mounted Displays".

*Primary Examiner*—Paul M. Dzierzynski
*Assistant Examiner*—Audrey Chang
*Attorney, Agent, or Firm*—Frishauf, Holtz, Goodman, Langer & Chick

[57] ABSTRACT

A projecting type image display apparatus includes a calculation processing unit for calculating a Fraunhofer diffraction image of an original image, an image display unit for producing/displaying the calculated Fraunhofer diffraction image, and an image converting unit for projecting the produced/displayed Fraunhofer diffraction image to the original image and projecting the original image on the screen. The calculation processing unit has a function of calculating the Fraunhofer diffraction image of the projection image and outputting the same to the image display unit. The image display unit is provided with an image display element on which the Fraunhofer diffraction image is optically displayed. The image projecting unit is provided with first and second lenses for converting the Fraunhofer diffraction image to the original image and projecting the original image on the screen.

27 Claims, 13 Drawing Sheets

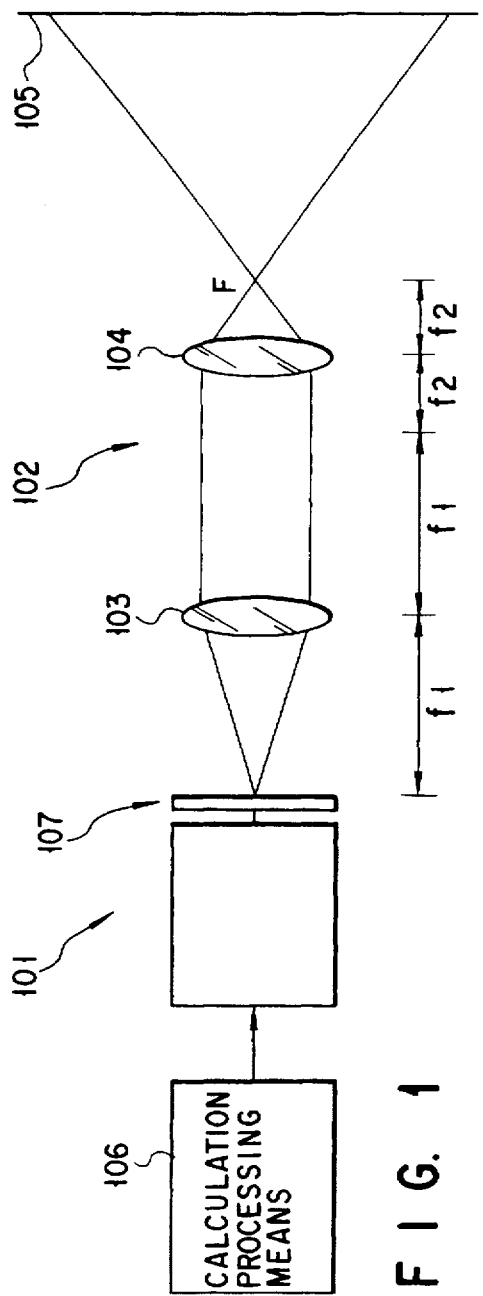
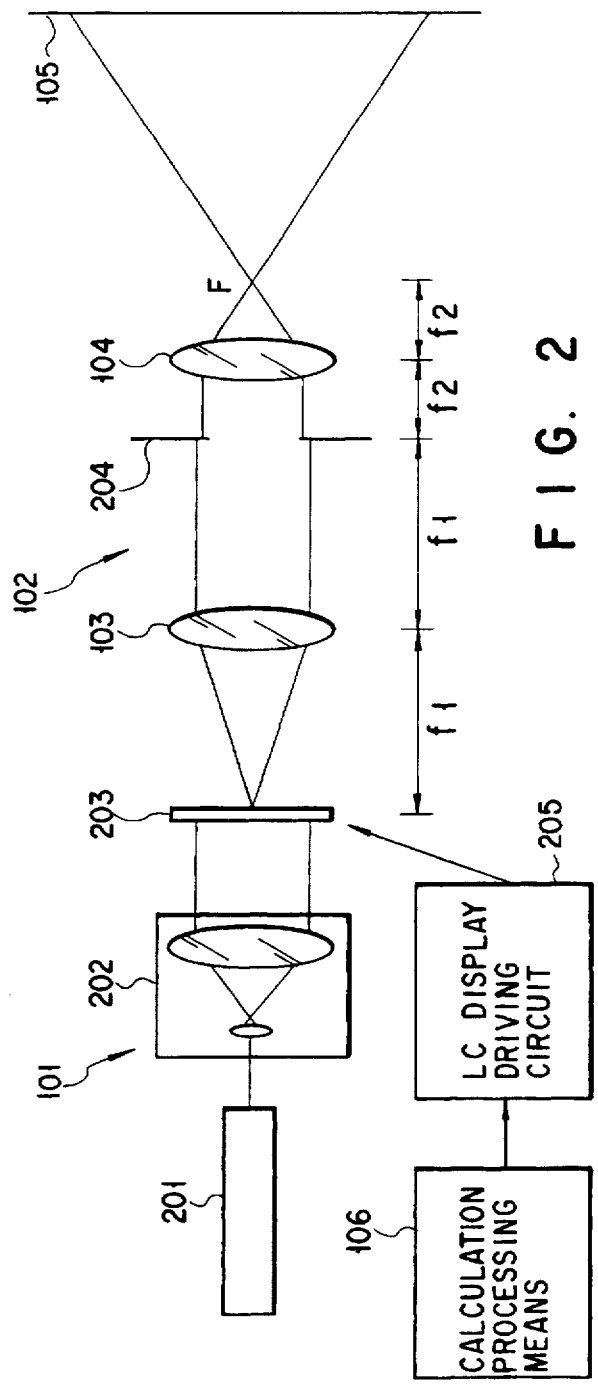

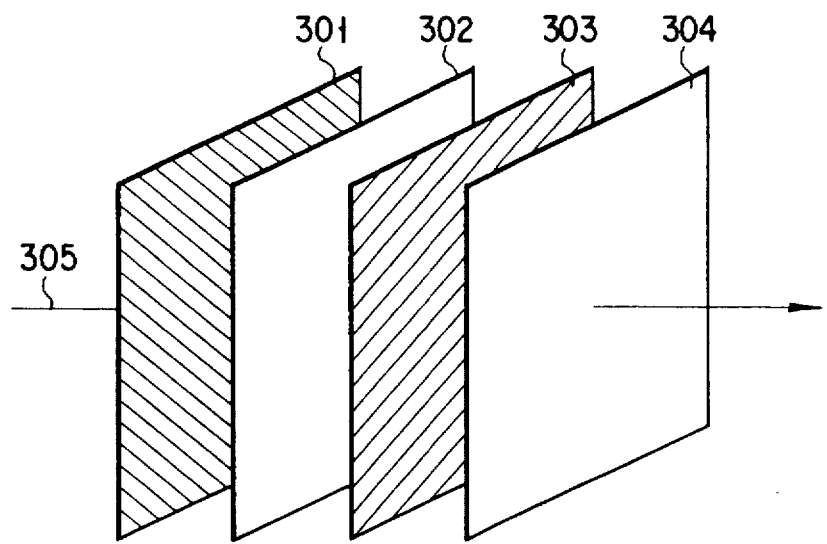
F I G. 3
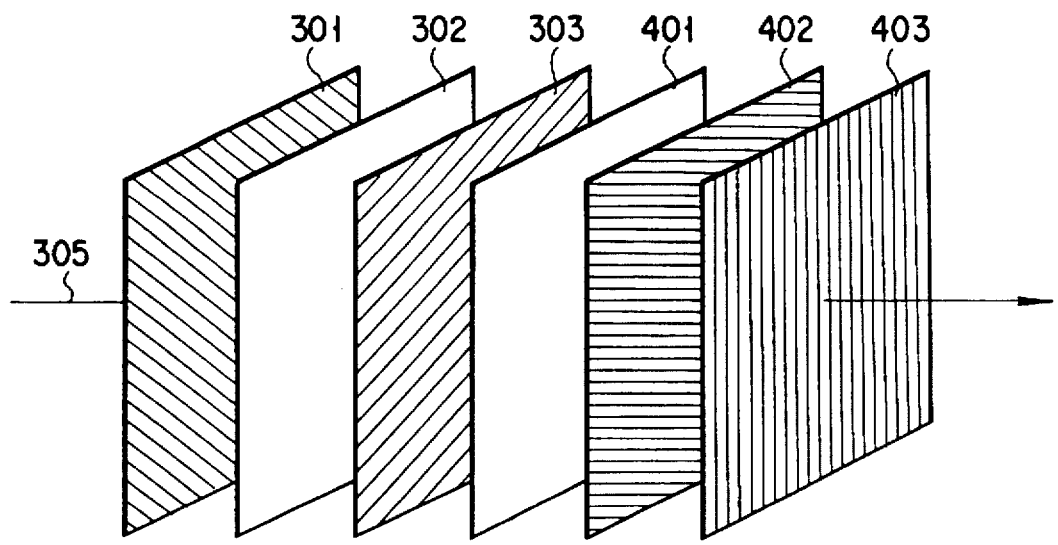
F I G. 4

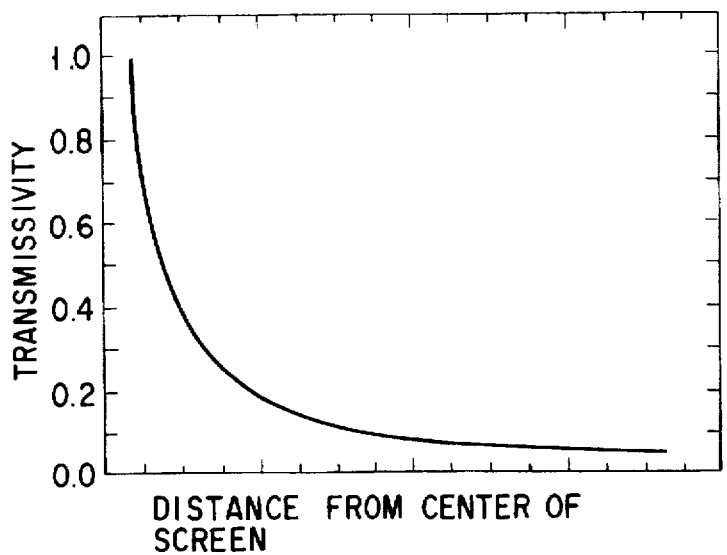
FIG. 7A
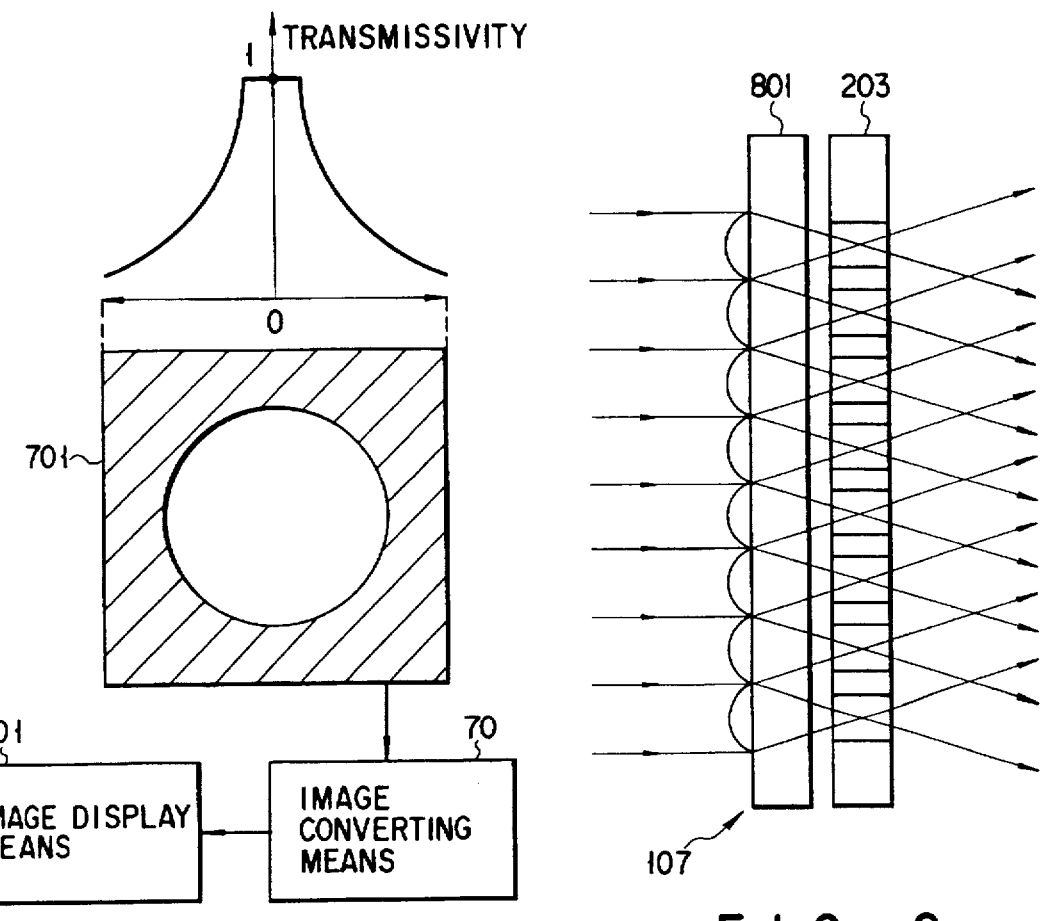
FIG. 7B
FIG. 8

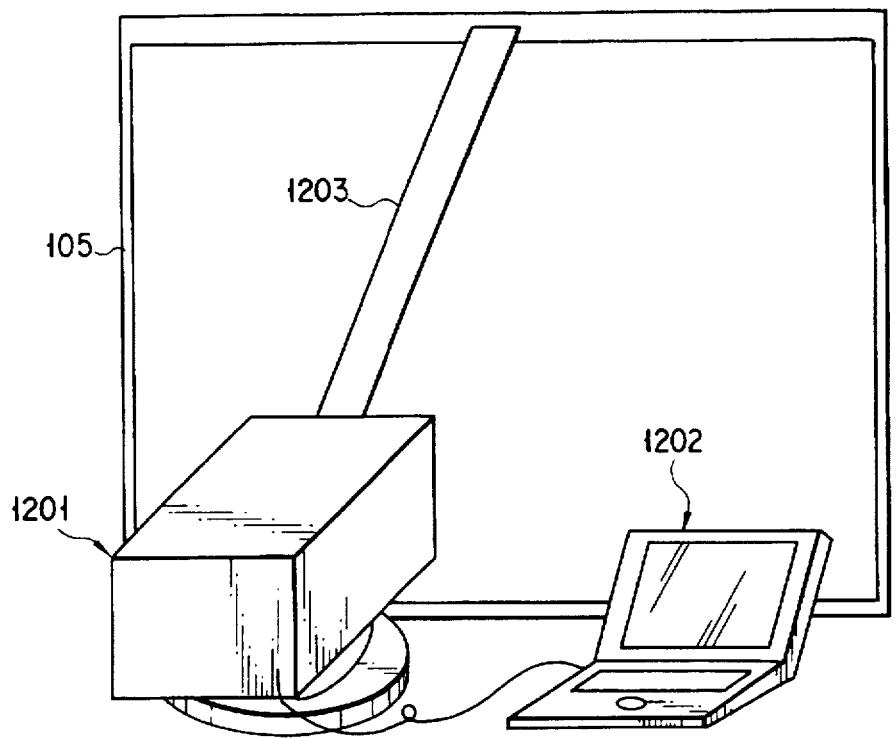
F I G. 12
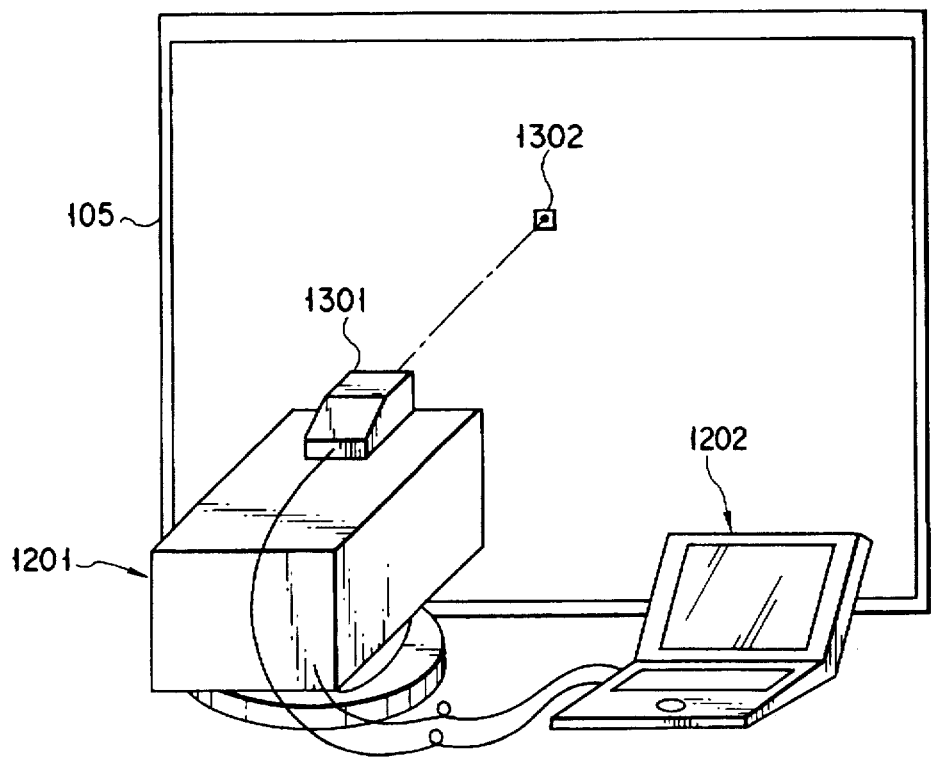
F I G. 13

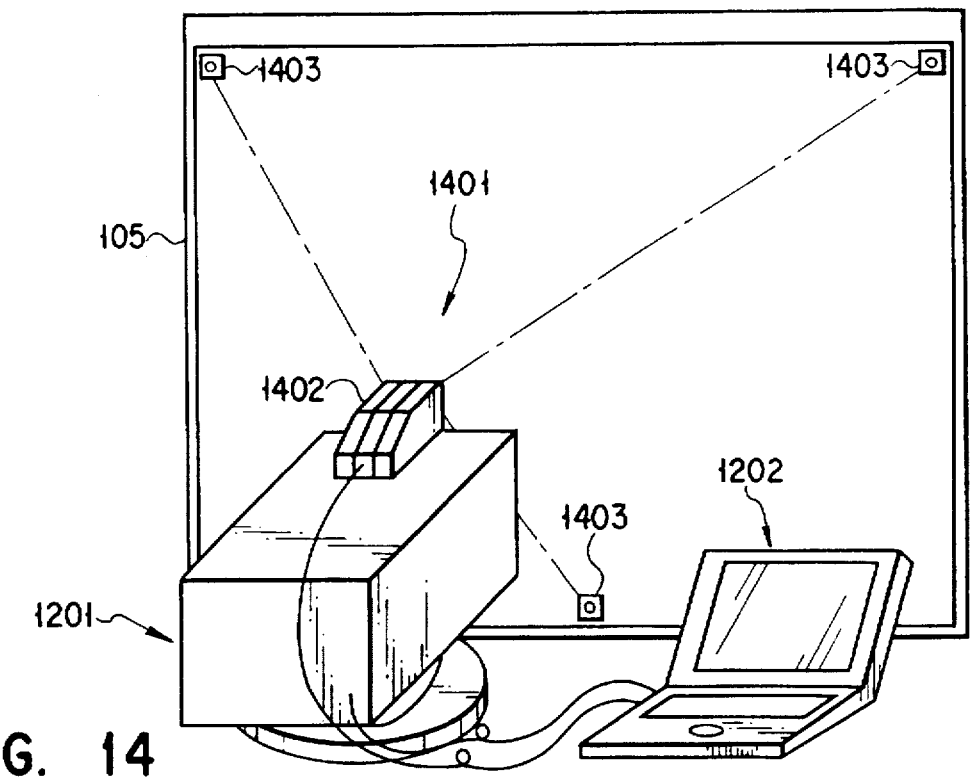
F I G. 14
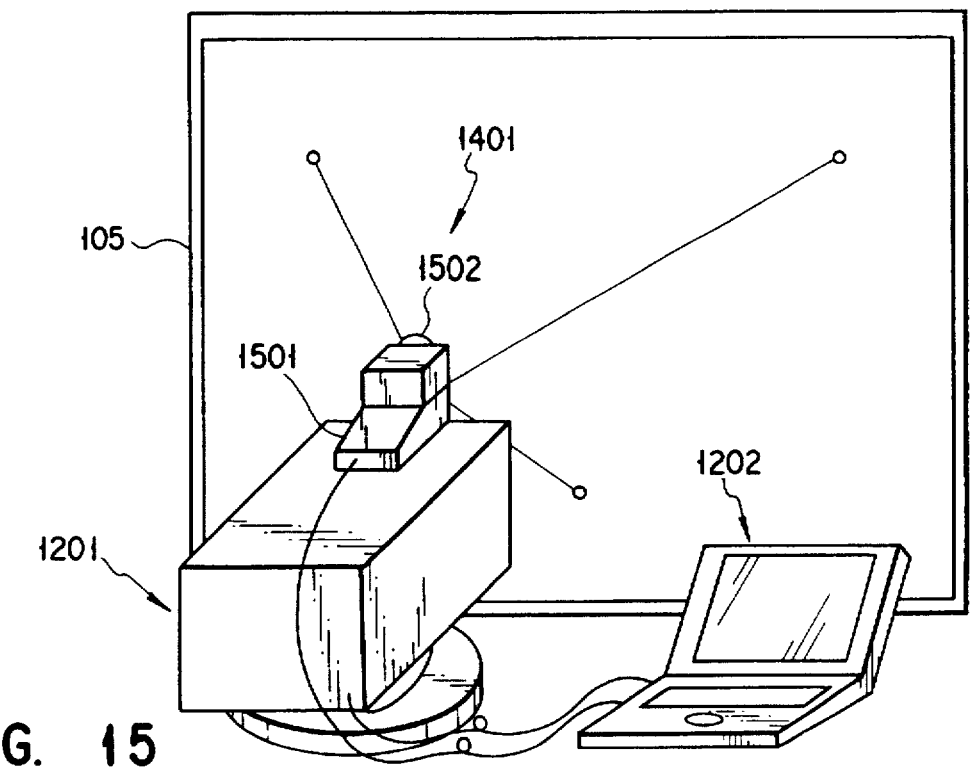
F I G. 15

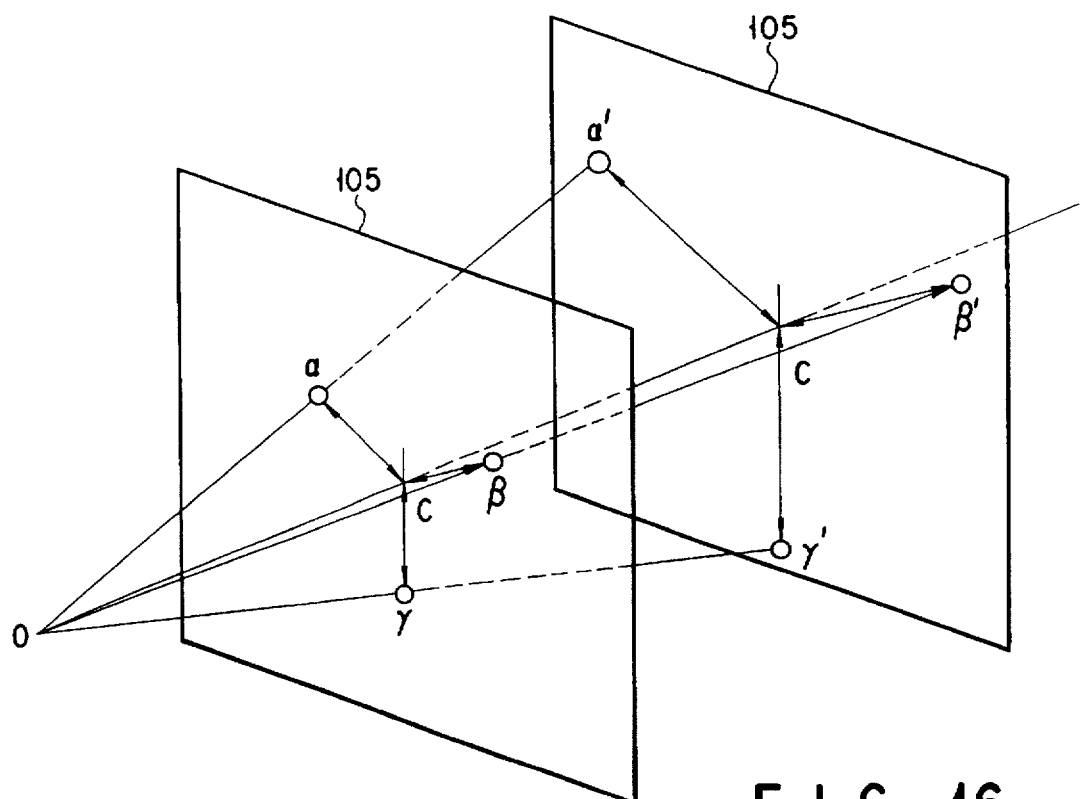
F I G. 16
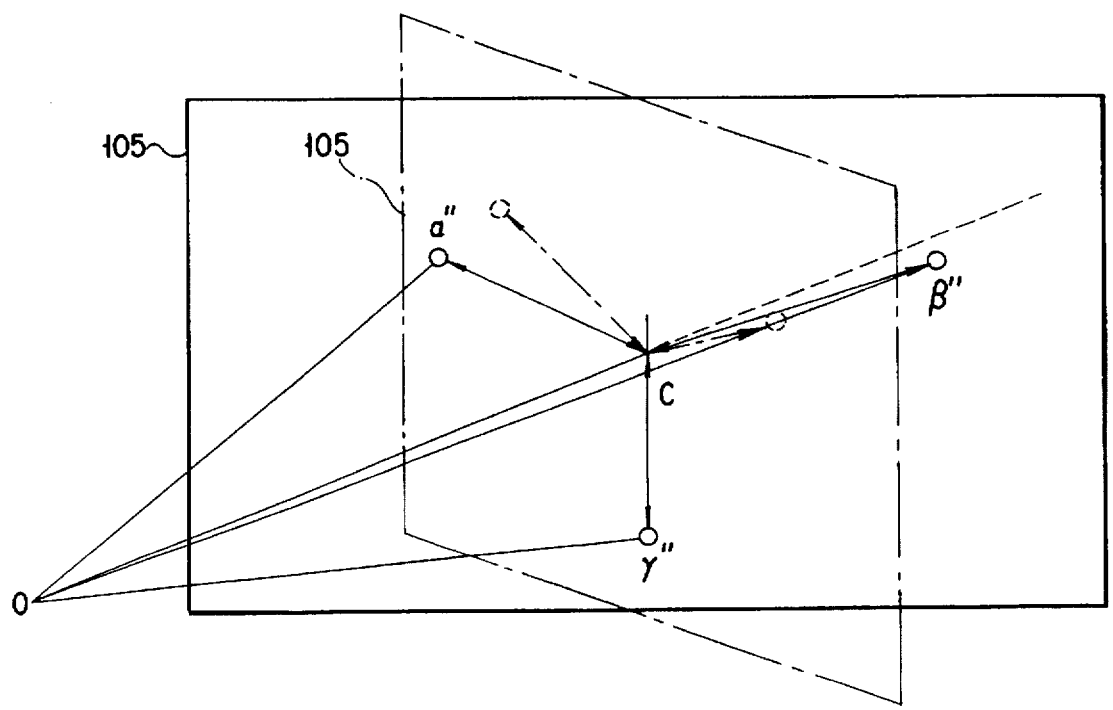
F I G. 17

PROJECTION TYPE IMAGE DISPLAY APPARATUS

BACKGROUND OF THE INVENTION

1. Field of the Invention

The present invention relates to a projection-type image display apparatus for projecting and displaying a wide-field-angle, high-precision image on a screen.

2. Description of the Related Art

In a conventional projection type image display apparatus, a wide-field-angle, stereoscopic image is easily produced, for example, by optically enlarging an image produced by an image display device.

In this method, however, pixels themselves of the image display device, as well as the image, are enlarged and presented. Consequently, the image quality deteriorates. For example, individual pixels are visually sensed or the band of a display image is limited. In other words, the spatial resolution characteristics of the entire system are restricted by those of the image display device.

For example, Jap. Pat. Appln. KOKAI Publication No. 59-119982 discloses, as means for solving the above problem, a method wherein one image is divided into a plurality of partial images and the respective partial images are assigned to a plurality of image display devices. According to this method, overlapping images are displayed on peripheral portions of adjacent partial images. When an image is synthesized by an enlarging optical system, the peripheral portions are displayed as overlapping each other. Thereby, continuity of image is obtained (hereinafter referred to as "Prior Art 1").

According to Prior Art 1, even when a wide-field-angle image is to be obtained, the spatial resolution characteristics can be prevented from deteriorating by increasing the number of image display devices.

In an image display means applied to the radar system disclosed in U.S. Pat. No. 5,079,555, various spatial frequency components (sine wave components) included in an image are presented one by one on a screen. These frequency components are temporally synthesized (i.e. subjected to Fourier composition), thereby forming an original image (hereinafter referred to as Prior Art 2).

According to Prior Art 2, the image produced by the image display device is a Fourier-transformed image of the original image. Thus, the spatial resolution characteristics of the image display device do not directly restrict the spatial resolution characteristics of the original image formed on the screen.

In the method of Prior Art 1, however, when a number of image display devices are used to enhance the resolution, mutual alignment of individual image display devices is complex and difficult, and the size of the apparatus increases inevitably. In addition, when images are displayed in an overlapping manner, it is generally difficult to set the luminance of the over-lapping portion at a value equal to that of the surrounding portion (non-over-lapping portion), resulting in unnatural seams of the partial images.

In the image display means applied to Prior Art 2, it is necessary to project and display all spatial frequency components of the image on the screen in a time period within which the human visual sense system can synthesize all presented visual information. Thus, images applicable to this image display means are limited. This image display means is not suitable for displaying an image having a complex Fourier transform spectrum.

SUMMARY OF THE INVENTION

The object of the present invention is to provide a projection type image display apparatus capable of forming a high-resolution image on a screen without influence of spatial resolution characteristics of an image display element.

In order to achieve this object, there is provided a projection type image display apparatus comprising: diffraction image display means for performing at least one of operations of producing and displaying a Fraunhofer diffraction image of an original image; and image projecting means for converting the Fraunhofer diffraction image to the original image and projecting the original image obtained by conversion on a screen.

In this structure, the diffraction image display means is a means for producing/displaying a Fraunhofer diffraction image of an original image to be projected on the screen. The image projecting means is an optical device comprising a plurality of lenses and an optical member such as a mirror of any type.

According to this structure, the Fraunhofer diffraction image of the original image to be projected on the screen is optically produced/displayed by diffraction image display means. The Fraunhofer diffraction image of the original image produced/displayed on the diffraction image display means is projected on the screen after being converted to an original image by the image projecting means. As a result, the original image is formed on the screen.

In this projection type image display apparatus, it is the Fraunhofer diffraction image of the original image that is produced/displayed by the diffraction image display means, and not the original image itself. Thus, the spatial resolution characteristics of the image projected on the screen are not influenced by the spatial resolution characteristics of the diffraction image display means. Therefore, even where a high field angle image is projected, a high-resolution image can be produced without the need to divide the image into partial images, as in the prior art.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows schematically the structure of a projection type image display apparatus according to the principle of the present invention;

FIG. 2 shows schematically the structure of a projection type image display apparatus according to first and second embodiments of the present invention;

FIG. 3 is a perspective view showing schematically the structure of a liquid crystal display applied to the first embodiment of the present invention;

FIG. 4 is a perspective view showing schematically the structure of a liquid crystal display applied to the second embodiment of the present invention;

FIG. 7A is a graph showing a transmittance distribution of a concentration distribution filter applied to a third embodiment of the invention, and FIG. 7B is a plan view of a density distribution filter, the transmittance of which is indicated by the density of dots;

FIG. 8 shows the structure of a micro-lens array and a liquid crystal display applied to a fourth embodiment of the invention;

FIG. 12 shows schematically the structure of a projection type image display apparatus according to a seventh embodiment of the invention;

FIG. 13 shows schematically the structure of a projection type image display apparatus according to an eighth embodiment of the invention;

FIG. 14 shows schematically the structure of a projection type image display apparatus according to a ninth embodiment of the invention;

FIG. 15 shows schematically the structure of a projection type image display apparatus according to a tenth embodiment of the invention;

FIG. 16 is a diagram for explaining the principle of the calculation processing applied to the tenth embodiment of the invention;

FIG. 17 is a diagram for explaining the principle of the calculation processing applied to the tenth embodiment of the invention;

DETAILED DESCRIPTION OF THE PREFERRED EMBODIMENTS

Figure 5:
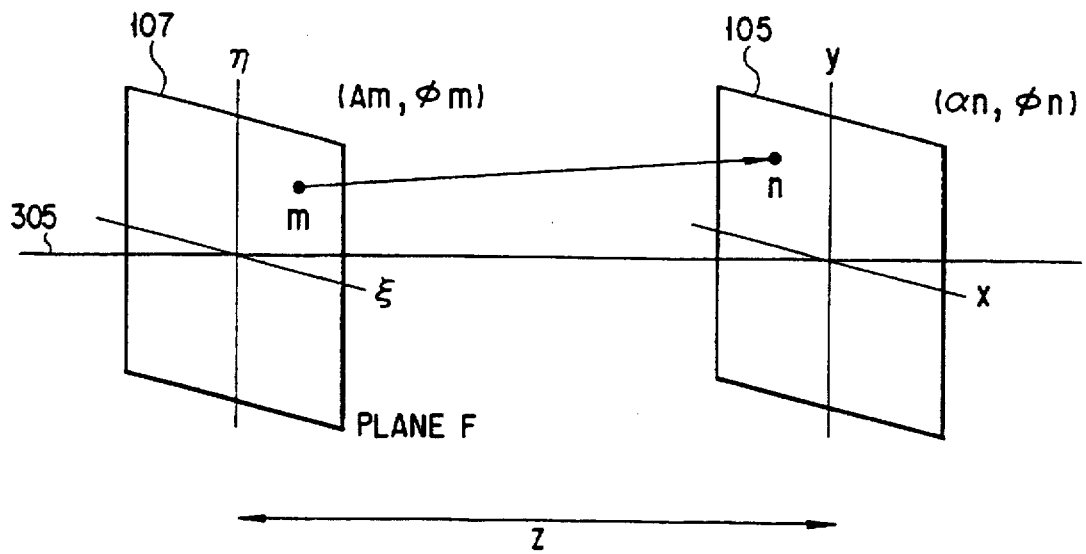
FIG. 5 is a diagram for explaining the principle of a calculation process performed by calculation processing means applied to the first and second embodiments of the present invention.

The principle of the present invention will now be described at first, and then preferred embodiments to which the principle of the invention is applied will be described with reference to the accompanying drawings.

As is shown in FIG. 1, a projection type image display apparatus according to the principle of the present invention comprises calculation processing means 106 for calculating a Fraunhofer diffraction image of an original image, image display means 101 for generating and displaying the Fraunhofer diffraction image calculated by the calculation processing means 106, and image projecting means 102 for converting the Fraunhofer diffraction image generated and displayed by the image display means 101 to the original image and projecting the original image obtained by conversion onto a screen 105.

The calculation processing means 106 calculates a Fraunhofer diffraction image of the original image to be projected onto the screen 105 and outputs the calculated Fraunhofer diffraction image to the image display means 101.

The image display means 101 includes an image display element 107 for optically displaying the Fraunhofer diffraction image of the original image input to the image display means 101.

The image projecting means 102 includes first and second lenses 103 and 104. The Fraunhofer diffraction image of the original image optically displayed on the image display element 107 is transmitted to a plane F (i.e. an image-side focal plane of the second lens 104) through the first and second lenses 103 and 104.

The image display element 107 and plane F are situated on the basis of the focal distances of the first and second lenses 103 and 104, respectively. Specifically, the image display element 107 is situated at an object-side focal point of the first lens 103 (focal distance: f1). An object-side focal point of the second lens 104 (focal distance: f2) is located at the image-side focal point of the first lens 103. The plane F is defined at an image-side focal point of the second lens 104.

As a result, the image display element 107 and the image-side focal point (i.e. plane F) of the second lens 104 are located in an optically conjugate relationship.

Thus, the Fraunhofer diffraction image transmitted to the plane F is projected as the original image on the screen 105 situated apart from the plane F.

As has been described above, according to the principle of the present invention, the image display element 107 and the screen 105 are not situated in a conjugate relationship. Therefore, the spatial resolution characteristics of the image projected on the screen 105 are not restricted by the spatial resolution characteristics of the image display means 101.

On the other hand, the obtained field angle is determined by the F-number of the second lens 104 (if an array-shaped image display element is used as image display element 107, the F-number corresponding to the size of each pixel of the image display element), independently of the resolution characteristics of the image. Accordingly, a wide field angle can be obtained, independently of the spatial resolution characteristics of the image display element 107, for example, by using a lens with a small F-number as second lens 104, or by using an image display element array having small pixels as image display element 107. Therefore, a wide field-angle image can be finely projected with high resolution, without dividing the image into partial images, unlike the prior art.

With the projection type image display apparatus according to the principle of the present invention, an image capable of meeting two conditions of a wide field angle and a high resolution can be projected on the screen 105.

Referring to FIGS. 2 to 6, a description will now be given of projection type image display apparatuses according to first and second embodiments of the present invention, to which the above-described principle is applied. In describing the first and second embodiments, the structural elements as mentioned in connection with the above-described principle are denoted by like reference numerals and a description thereof is omitted.

As is shown in FIG. 2, image display means 101 applied to the first and second embodiments includes, as image display element 107 (see FIG. 1), a liquid crystal (LC) display 203 in which pixels are arranged two-dimensionally.

The LC display 203 is connected to an LC display driving circuit 205. The LC display driving circuit 205 controls the LC display 203 on the basis of data calculated by the calculation processing means 106.

Spectra are assigned to the respective pixels of the LC display 203. A Fraunhofer diffraction image of the original image is produced by an aggregation of these spectra. The Fraunhofer diffraction image displayed by the LC display 203 is an image generated by a computer or an image generated by a calculation process from an image recorded on a film or a magnetic (magnetooptic) recording medium by means of a camera, etc. It is possible, however, to use a Fraunhofer diffraction image generated directly by a computer or a Fraunhofer diffraction image generated by optical means on the basis of an actual image.

A coherent beam emitted from a coherent light source, e.g. a laser 201, and expanded uniformly by a beam expander 202 is radiated on the LC display 203. An incoherent light source may be applied to the present embodiments if the coherency of an output from the light source is enhanced through a spatial filter.

The Fraunhofer diffraction image generated by the LC display 203 is transmitted to the plane F (i.e. the object-side focal point of the second lens 104) by the image projecting means 102 and produced as an original image on the screen 105.

The shape and size of the visual field of the image projected on the screen 105 can be determined, for example, by disposing a mask 204 having a predetermined opening near the image-side focal point (i.e. object-side focal point of the second lens 104) of the first lens 103.

In order to exactly reproduce the original image on the screen 105, the amplitude information and phase information of the Fraunhofer diffraction image must be exactly displayed by the LC display 203.

As will be described later, in the first and second embodiments, two LC display elements are used to independently control the amplitude information and phase information. The first embodiment differs from the second embodiment with respect to the means for displaying phase information.

FIG. 3 shows a structure of the LC display 203 applied to the first embodiment.

As is shown in FIG. 3, the LC display 203 comprises a first polarizer 301 for passing only a predetermined polarized component of a laser beam output from the beam expander 202 (see FIG. 2); a first LC display element 302 for changing the direction of polarization of the laser beam emanating from the first polarizer 301; a second polarizer 303 for passing only a predetermined polarized component of the laser beam; and a second LC display element 304 capable of varying the refractive index of the polarized component selected by the second polarizer 303. The first and second LC display elements 302 and 304 are constructed such that their pixel positions coincide with each other.

The first LC display element 302 functions to change the direction of polarization of the laser beam led from the first polarizer 301 to the pixels (not shown) of the first LC display element 302, by controlling a voltage applied to each of the pixels. Thereby, the first LC display element 302 pattern-controls the amount of light passed through the second polarizer 303. As a result, the amplitude information of the Fraunhofer diffraction image can be controlled by the amount of light passed through each pixel.

The second LC display element 304 functions to vary its birefringence by controlling a voltage applied to each of the pixels (not shown) thereof. By varying the birefringence, the refractive index of the polarized component selected by the second polarizer 303 can be changed. As a result, since the relative lengths of optical paths among the pixels can be varied, the phase information of the Fraunhofer diffraction image can be controlled.

Thus, the amplitude information and phase information of the Fraunhofer diffraction image can be controlled independently by the first and second LC display elements 302 and 304. In addition, by using the LC display elements 302 and 304, the weight and size of the apparatus can be reduced and the power consumption can be decreased.

FIG. 4 shows a structure of the LC display 203 applied to the second embodiment.

As is shown in FIG. 4, the LC display 203 comprises a first polarizer 301 for passing only a predetermined polarized component of a laser beam output from the beam expander 202 (see FIG. 2); a first LC display element 302 for changing the direction of polarization of the laser beam emanating from the first polarizer 301; a second polarizer 303 for passing only a predetermined polarized component of the laser beam, the direction of polarization of which has been changed by the first LC display element 302; a second LC display element 401 for changing the direction of polarization of the laser beam passed through the second polarizer 303; a λ/4 plate 402 for giving a π/2 phase difference to the corresponding polarized components of the laser beam, the direction of polarization of which has been changed by the second LC display element 401; and a third polarizer 403 for passing only a predetermined polarized component of the laser beam provided with the phase difference by the λ/4 plate 402.

Both the first and second LC display elements 302 and 401 used in the present embodiment function to change the direction of polarization of the laser beam by controlling a voltage applied to each pixel (not shown) thereof. The first and second LC display elements 302 and 401 are constructed such that their pixel positions coincide with each other.

According to this structure, the voltage applied to each pixel of the first LC display element 302 is controlled to change the direction of polarization of the laser beam led from the first polarizer 301, thereby controlling the pattern of the amount of light passed through the second polarizer 303. As a result, the amplitude information of the Fraunhofer diffraction image can be controlled.

In the first embodiment, the phase information is controlled by varying the length of the optical path of light passing through each pixel. By contrast, in the second embodiment, the beam led to each pixel of the second LC display element 401 from the second polarizer 303 is divided into components of phases differing by π/2 (e.g. a sin wave and a cos wave). By varying the ratio between the amplitudes thereof, the phase information is controlled.

Specifically, the λ/4 plate 402 is situated on the optical path between the second LC display element 401 and third polarizer 403, and the laser beam led from the second LC display element 401 is provided with a phase difference of π/2 by the λ/4 plate 402.

Suppose that one of the crystal axes of the λ/4 plate 402 is referred to as "s-axis" (i.e. an axis in which the phase speed of light is slower) and the other axis perpendicular to the s-axis is referred to as "f-axis" (i.e. an axis in which the phase speed of light is faster). If the amplitude of the laser beam led from the second LC display element 401 is A, an s-axis polarized component $A_s$ and an f-axis polarized component $A_f$ of the laser beam are given by $$A_s = A \cos(\alpha) \quad (1)$$

$$A_f = A \sin(\alpha) \quad (2)$$

where α is an angle defined by the direction of polarization of the laser beam led from the second LC display element 401 and the direction of the s-axis.

For the purpose of simplicity, suppose that the s-axis of the λ/4 plate 402 is aligned with the direction of polarization of the laser beam output from the second polarizer 303. In general, however, it is not necessary to make the direction of the crystal axis of the λ/4 plate 402 coincide with the direction of polarization of the output beam of the second polarizer 303.

A phase difference of π/2 is generated by the λ/4 plate 402 between an s-axis polarized component $W_s$ and an f-axis polarized component $W_f$ of the laser beam provided with the phase difference of π/2.

If the angular frequency of light is ω and time is t, the s-axis polarized component $W_s$ and f-axis polarized component $W_f$ of the optical wave passed through the λ/4 plate 402 are represented by $$\begin{aligned} W_s &= A_s \exp\{-2\pi i(\omega t)\} \\ &= A\cos(\alpha) \cdot \exp\{-2\pi i(\omega t)\} \end{aligned} \quad (3)$$

$$\begin{aligned} W_f &= A_f \exp[-2\pi i\{\omega t + (\pi/2)\}] \\ &= A\sin(\alpha) \cdot \exp[-2\pi i\{\omega t + (\pi/2)\}] \end{aligned} \quad (4)$$

Further, only a predetermined polarized component of the laser beam having the above properties is passed through the third polarizer 403.

Specifically, the transmission axis of the third polarizer 403 is set to have a substantially equal angle to the s-axis and f-axis of the λ/4 plate 402 (in this case, about 45° since it is supposed that the s-axis is perpendicular to the f-axis).

The entire laser beam passing through the third polarizer 403 includes polarized components of about 45° to the s-axis or f-axis of the λ/4 plate 402 and is coherent. Thus, the amplitude distribution of the laser beam is given by $$\begin{aligned} W &= W_s + W_f \\ &= 2^{-1/2} \cdot A\exp\{-2\pi i(\omega t + \alpha)\} \end{aligned} \quad (5)$$

As is clear from formula (5), the phase information of the laser beam can be represented by a polarization angle (in relation to the s-axis polarized component) generated up to the stage of the second LC display element 401 and can be controlled by the voltage applied to the second LC display element 401.

By controlling each of the pixels of the second LC display element 401 in the above manner, the phase information of the Fraunhofer diffraction image can be controlled, independent of the amplitude information.

In the above formulae, loss of light in each element is not considered. However, the effect of this technique does not substantially change due to the loss of light. Even if the amount of loss of light varies, depending on the polarized component, the adverse affect due to the variation in amount of loss of light can be canceled by suitably choosing the direction of the transmission axis of the third polarizer 403. In addition, in the present embodiment, since the first and second LC display elements 302 and 401 of the same type are used, matching of the optical system, e.g. alignment of the pixels of the two LC display elements, is easily performed. Furthermore, since the LC display elements 302 and 401 are used, the weight and size of the apparatus as well as the power consumption can be reduced.

Now referring to FIG. 5, a description will now be given of the method of calculating a Fraunhofer diffraction image to be displayed on the image display element by the calculation processing means 106 in the projection type image display apparatus having the image display element situated two-dimensionally, as shown in FIG. 2.

For the purpose of simplicity, FIG. 5 shows only the image display element 107 and the screen 105 situated at a distance Z from the image display element 107 in the direction of optical axis 305.

Suppose that in the step of projecting the Fraunhofer diffraction image displayed by the image display element 107 onto the screen 105, light emitted from each pixel of the image display element 107 is treated as a spherical wave and the spherical waves are synthesized on the screen 105 to form an amplitude distribution.

In addition, supposed that the image display element 107 comprises an M-number of pixels, the amplitude at the m-th pixel is $A_m$ and the phase at the m-th pixel is $\Phi_m$. In this case, the amplitude $\alpha_n$ and phase $\Phi_n$ at a given point n on the screen 105 (calculation is performed at an N-number of points) are expressed by $$\alpha_n \exp[-j(\phi_n)] = \sum_{m=1}^{M} A_m \exp[-j(\theta_{mn} + \Phi_m)] \quad (6)$$

In this equation, $\theta_{mn}$ is a phase error occurring when light travels from the m-th pixel position m of the image display element 107 to the n-th point n on the screen 105. The phase error is expressed by a value obtained by multiplying 2π (rad) by a fraction occurring at the time of calculating a distance between the point m on the image display element 107 and the point n on the screen 105, with the wavelength of light being used as a unit.

A luminance profile $E_n$ on the screen 105 is a product between the above equation (6) and a complex conjugate (indicated by symbol *) and is expressed by $$E_n = \alpha_n^* \cdot \alpha_n \quad (7)$$

This calculation is performed for all points on the screen 105, thereby obtaining an image to be projected on the screen 105.

An image to be projected on the screen 105 is generally expressed by an intensity distribution and, in many cases, phase information is lost. Thus, it is very complex to perform an inverse calculation, i.e. a calculation for calculating amplitude information and phase information of a Fraunhofer diffraction image to be displayed on the image display element 107 in order to project a desired image on the screen 105. Furthermore, a solution obtained by this inverse calculation is not definitively determined. For example, when the inverse calculation is performed, the luminance profile $E_n$ on the screen 105 is considered as a function of amplitude $\alpha_m$ and phase $\phi_m$ and it is expressed by $$E_n = (E_n)_0 + \sum_{k=1}^{N} \left( \frac{\partial E_n}{\partial \alpha_k} \right)_0 \Delta\alpha_k + \sum_{k=1}^{N} \left( \frac{\partial E_n}{\partial \phi_k} \right)_0 \Delta\phi_k \quad (8)$$

In this equation, $\left( \frac{\partial E_n}{\partial \alpha_k} \right)_0$ represents $\frac{\partial E_n}{\partial \alpha_k}$ when $\alpha_k = \alpha_{k0}$ $\left( \frac{\partial E_n}{\partial \phi_k} \right)_0$ represents $\frac{\partial E_n}{\partial \phi_k}$ when $\phi_k = \phi_{k0}$ Suppose that a vector of components $\Delta\alpha_k$ and $\Delta\phi_k$ is X, and a vector of components $E_n - (E_{n0})$ is Q.

If a matrix of the components of a differential coefficient of $E_n$, i.e.

$\left( \frac{\partial E_n}{\alpha_k} \right)_0$ and $\left( \frac{\partial E_n}{\phi_k} \right)_0$ is P, equation (8) can be expressed by $$PX = Q \quad (10)$$

In general, $2M \neq N$ and therefore the solution of equation (10) is given by $$X = (P^T P)^{-1} \cdot P^T \cdot Q \quad (11)$$

From equation (11), $\Delta\alpha_k$ and $\Delta\phi_k$ are calculated.

The precision of calculation of $\alpha_m$ and $\phi_m$ can be enhanced by repeating the process of "substituting the calculated values in equation (9) to obtain $\alpha_k$ and $\phi_k$, and then substituting $\alpha_k$ and $\phi_k$ in formula (8)."

In general, however, the above calculation requires a great deal of calculation operations. For example, when an LCD (Liquid Crystal Display) of 100,000 pixels (M=100,000) is used, an inverse matrix of 200,000×200,000 needs to be calculated. In addition, this inverse matrix calculation needs to be performed twice or more each time an approximating calculation is executed. Consequently, a great deal of time is required for the calculation operations. Furthermore, various conditions for limitation must be set to obtain a specific solution by convergence.

Figure 6:
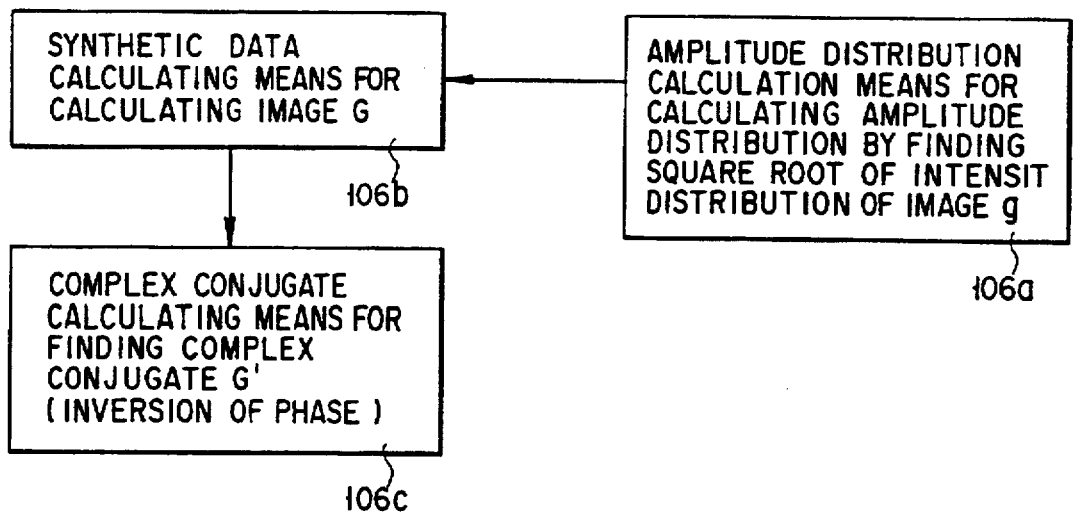
FIG. 6 illustrates the procedure of the calculation process performed by the calculation processing means applied to the first and second embodiments.

Referring to FIGS. 5 and 6, a description will now be given of a method of calculating amplitude information and phase information of a Fraunhofer diffraction image to be displayed by the image display element 107, without performing the above-mentioned enormous calculating operations.

Suppose that a phase conjugate mirror (not shown) is situated at the position of the image display element 107 shown in FIG. 5. In this case, light waves (spherical waves) emanating from a given point on the screen 105 are reflected by the phase conjugate mirror and returned to that given point on the screen 105 without fail. At this time, the light waves (spherical waves) are reflected from the phase conjugate mirror so that their phase is reversed simply.

Accordingly, even in the case where the original image is selected voluntarily, the sum of light waves (spherical waves) on the face of the image display element 107 (i.e. the face of the phase conjugate mirror) emanating from all points on the screen 105 is calculated. By obtaining a complex conjugate of the calculation result, the original image is reproduced on the screen 105.

The specific means for calculation will now be described with reference to FIG. 6.

(1) Amplitude distribution calculating means 106a calculates an amplitude distribution by finding the square root of the intensity distribution of an image g to be projected on the screen 105.

(2) Synthetic data calculating means 106b calculates an image G produced on the image display element 107, assuming that spherical waves have been emitted from all points on the screen 105 and the spherical waves have been synthesized on the image display element 107. Specifically, the following equation is applied to all of M points on the image display element 107:

$$A_m \exp[-j(\Phi_m)] = \sum_{n=1}^{N} \alpha_n \exp[-j(\theta_{mn} + \phi_n)] \quad (12)$$

(3) Complex conjugate calculating means 106c calculates a complex conjugate G' of a synthetic pattern G on the image display element 107.

According to the above steps (1) to (3), the amount of calculations can be greatly reduced and therefore it is possible to calculate amplitude information and phase information of the Fraunhofer diffraction image to be displayed on the image display element 107.

A third embodiment of the projection type image display apparatus of the present invention will now be described with reference to FIGS. 2 and 7. The structural elements common to those in the first and second embodiments are denoted by like reference numerals and a description thereof is omitted.

The projection type image display apparatus of this third embodiment is characterized by comprising means for projecting and displaying an image efficiently and precisely on the basis of the quality of the image to be displayed.

When an ambient scene is taken as an image and a Fraunhofer diffraction image is calculated by the above procedure, the amplitude of a central portion of the image display element 107 is generally high and the amplitude decreases gradually toward a peripheral portion. In this case, if the display precision (the number of displayable gradients) assigned to each of the pixels of the image display element 107 is constant, the precision of the amplitude component at the peripheral portion decreases and the quality of a produced retinal image deteriorates.

In order to prevent deterioration in image quality, the projection type image display apparatus of the present embodiment is provided with light amount distribution control means having a transmissivity distribution, as shown in FIG. 7A, i.e. a density distribution filter 701 (see FIG. 7B), near the location where the Fraunhofer diffraction image is produced, as in the case of the LC display 203 (see FIG. 2).

As is shown in FIG. 7A, the transmissivity of the central portion of the density distribution filter 701 is highest and that of the other portion decreases gradually towards the periphery of the filter 701. FIG. 7B shows schematically the density distribution filter 701, with the transmissivity thereof being indicated on the basis of the density of dots.

According to the density distribution filter 701, the Fraunhofer diffraction image can be produced with equal precision at the peripheral portion and central portion.

When the density distribution filter 701 is applied, it is necessary to divide the amplitude value indicated by each pixel of the image display element 107 (see FIG. 1) by a value of transmissivity at a corresponding position on the density distribution filter 701.

On the basis of the spatial distribution controlled by using the density distribution filter 701, image converting means 70 (see FIG. 7B) converts the image to be displayed on the image display means 101. It is thus possible to produce amplitude information of the Fraunhofer diffraction image with respect to each pixel of the image display element 107 of the image display means 101 with substantially equal display precision (the number of displayable gradients). As a result, a very fine image can be projected on the screen 105 without degrading the image quality.

In particular, when an LC display is used as image display element 107, it is difficult to eliminate leak light leaking from each of the pixels of the LC display. In addition, when the amplitude component is small, the influence of the leak light cannot be ignored. However, if the density distribution filter 701 of the present embodiment is used, it is possible to limit the ratio of leak light from each pixel at a substantially equal level.

In addition, since the amount of leak light can be reduced with respect to the entire LC display element 107, degradation of image contrast can be decreased or prevented.

In some cases, all spectra can be displayed with substantially equal precision, even without using the density distribution filter 701. For example, in the structure as shown in FIG. 2, in the case of constituting the beam expander 202 by an objective lens (not shown) for a microscope, a pinhole, and a collimator lens (not shown), an objective lens of a low magnification and a pinhole (not shown) of a relatively large diameter may be combined or a collimator lens with a short focal distance may be used, thereby illuminating the image display element 107 with light the spatial luminance distribution of which is expressed by a gauss distribution. By providing the illumination light itself with a luminance distribution, the same effect as with the use of the density distribution filter 701 can be obtained.

A fourth embodiment of the projection type image display apparatus of the present invention will now be described with reference to FIGS. 2 and 8. The structural elements common to those in the first and second embodiments are denoted by like reference numerals, and a description thereof is omitted.

The projection type image display apparatus according to the fourth embodiment is characterized by substituting a microlens array 801 and an LC display 203 for the image display element 107 (see FIG. 1).

As is shown in FIG. 8, the microlens array 801 is situated such that the position of each microlens coincide with that of each pixel of the LC display 203. Furthermore, the microlens array 801 and LC display 203 are arranged in the direction of optical axis in such a positional relationship that light incident on each microlens of the microlens array 801 is focused near the center of each pixel of the LC display 203.

In the projection type image display apparatus having the structure as shown in FIG. 2, the light diffracted by each pixel of the LC display 203 is a factor which determines the field angle on the screen 105. Thus, in order to obtain a large field angle, it is necessary to use an LC display element having small pixels or an LC display element having a high pixel density.

By contrast, in the present embodiment, the field angle of the image projected on the screen 105 is determined by the angular aperture of each microlens. Thus, even if an LC display element having a low pixel density is used as LC display 203, a projection image with a large field angle can be produced without influence by the magnitude of the aperture of each pixel.

A general LC display element is provided with a light shielding material between pixels. Light radiated on the light shielding material is absorbed or reflected by the light shielding material.

By contrast, according to the present embodiment, light which may otherwise be absorbed or reflected is collected by the microlens array 801 and radiated on the pixels of the LC display 203. As a result, the LC display 203 can be radiated efficiently, i.e. the light from the light source can be utilized efficiently.

A fifth embodiment of the projection type image display apparatus of the present invention will now be described with reference to FIGS. 9 and 10. The structural elements common to those in the first and second embodiments are denoted by like reference numerals and a description thereof is omitted.

In the preceding embodiments, for the purpose of simplicity, the image display method using monochromatic light is adopted. A color image, however, may be obtained in the following manner. The image display means 101 produces and displays a Fraunhofer diffraction image of each of light components having three or more wavelengths selected properly from a visible wavelength region, a color image is produced by the light of associated wavelength.

There are two methods for obtaining a color image on the basis of the above idea. In one method, images of all wavelength components are sequentially presented with the passing of time and are synthesized. In the other method, images of all wavelength components are presented simultaneously and synthesized.

Figure 9:
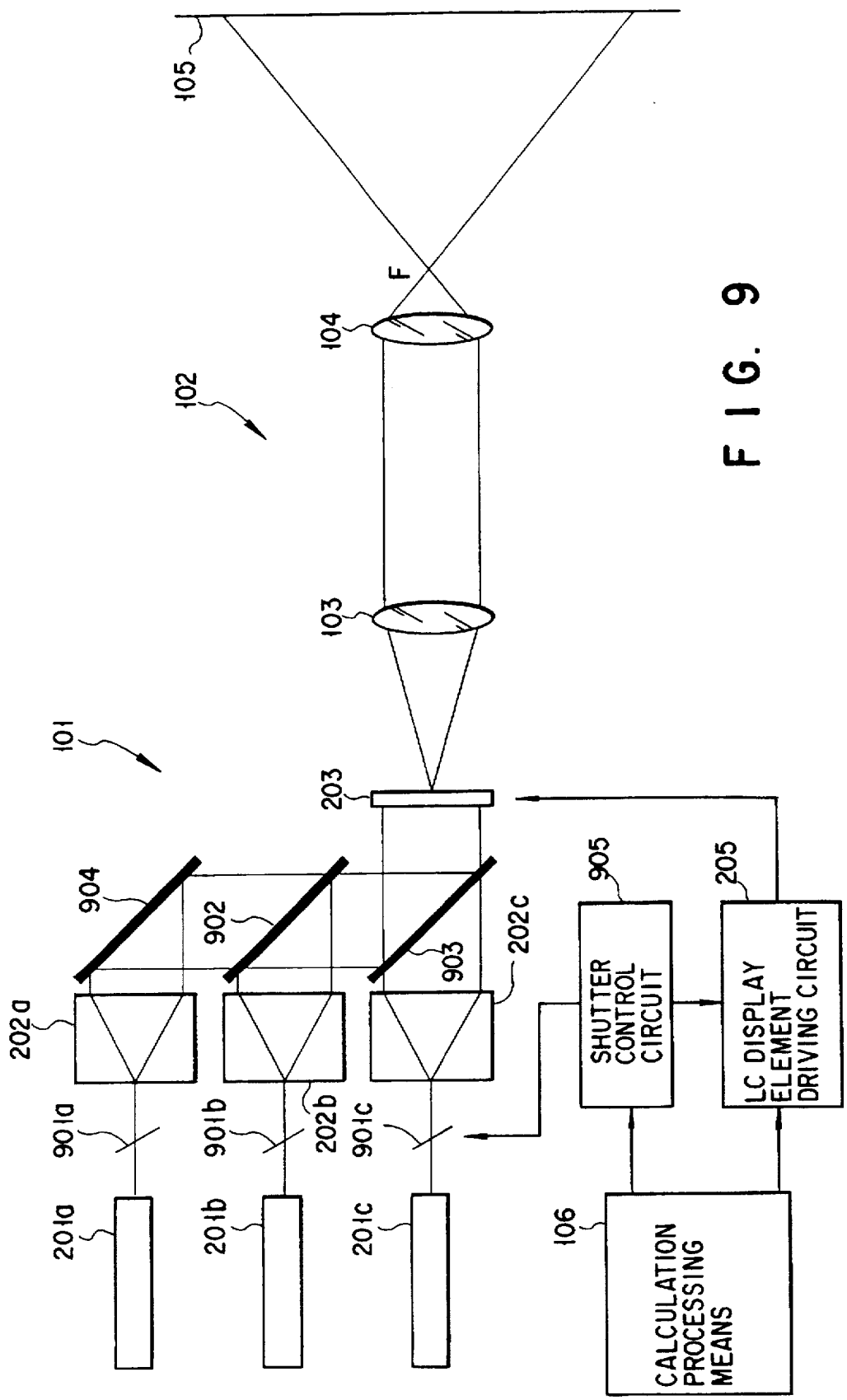
FIG. 9 shows schematically the structure of a projection type image display apparatus according to a fifth embodiment of the invention, wherein images of different wavelength components are presented and synthesized with the passing of time to produce a color image.

FIG. 9 shows an apparatus to which the method of sequentially presenting images of all wavelength components and synthesizing them is applied.

The apparatus of this embodiment comprises first to third lasers 201a, 201b and 201c as light sources having three different wavelengths, and an LC display 203 used as an LC display element. The LC display 203 is connected to an LC display element driving circuit 205. The LC display element driving circuit 205 is so designed that it can pattern-control the LC display 203 on the basis of calculation data output from calculation processing means 106.

As is shown in FIG. 9, laser beams of different wavelengths emitted from the first to third lasers 201a, 201b and 201c are successively subjected to selection of wavelength by first to third shutters 901a, 901b and 901c and are uniformly expanded by beam expanders 202a, 202b and 202c. The first to third shutters 901a, 901b and 901c are connected to a shutter control circuit 905. The shutter control circuit 905 is designed to properly control the first to third shutters 901a, 901b and 901c on the basis of the calculation data output from the calculation processing means 106.

A laser beam output from the third beam expander 202c is radiated on the LC display 203 via a second beam splitter 903.

A laser beam output from the second beam expander 202b is reflected by a first beam splitter 902 and then directed to the LC display 203 by the second beam splitter 903.

A laser beam output from the first beam expander 202a is reflected by a flat mirror 904 and then radiated on the LC display 203 via the first and second beam splitters 902 and 903.

According to this structure, synchronizing with the operation in which the wavelength is selected by the first to third shutters 901a, 901b and 901c controlled by the shutter control circuit 905, the Fraunhofer diffraction images corresponding to all wavelength components are displayed on the LC display 203.

At this time, if the Fraunhofer diffraction images corresponding to the three wavelength components are presented within the time period in which the Fraunhofer diffraction images are being added by visual system of observer, a projection image obtained by synthesizing these diffraction images is sensed as a color image.

According to this method, a color image can be projected on the screen 105 by using single LC display 203.

In another method, selection of wavelength is performed by elements such as plural kinds of interference filters, inserted successively in a light path including, e.g. a white lamp as a light source. Synchronizing with the selection of wavelength, the Fraunhofer diffraction image of the associated wavelength component is displayed by the LC display 203. In still another method, the frequency of an applied high-frequency driving pulse is varied by a deflector such as an acoustooptic modulating element, thereby controlling the angle of diffraction of light. The light of diffraction is passed through a pinhole or a slit to select the wavelength of the light. Synchronizing with the selection of wavelength, the Fraunhofer diffraction image of the associated wavelength component is displayed by the LC display 203. In each method, if the wavelength components of plural kinds are presented within the time period in which the wavelength components are being added by visual system of observer, the obtained projection image is sensed as a color image.

Figure 10:
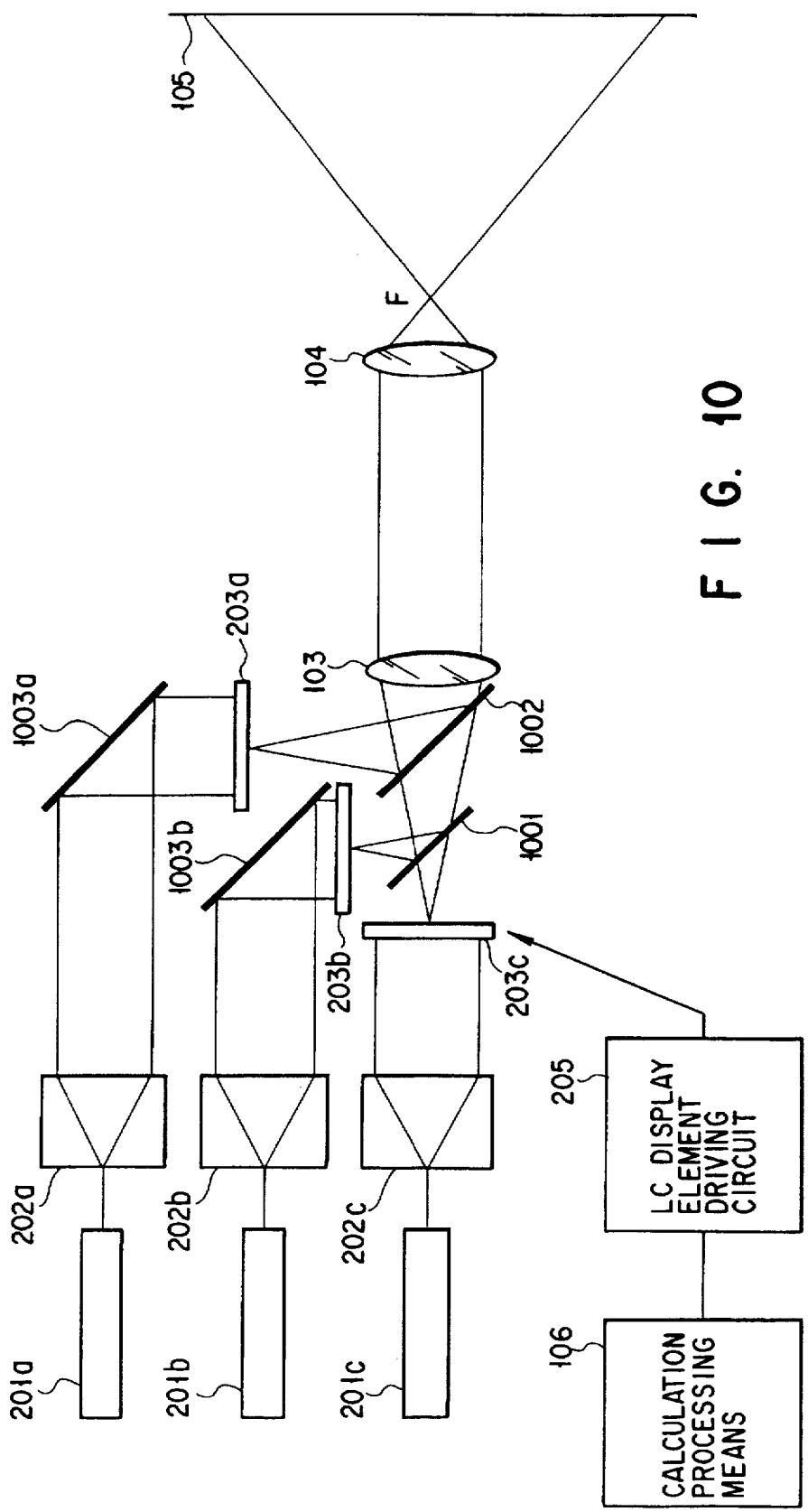
FIG. 10 shows schematically the structure of a projection type image display apparatus according to a fifth embodiment of the invention, wherein images of different wavelength components are presented and synthesized simultaneously to produce a color image.

FIG. 10 shows an apparatus to which the method of simultaneously presenting images of all wavelength components and synthesizing them is applied.

The apparatus of this embodiment includes first to third lasers 201a, 201b and 201c as light sources having different wavelengths, and first to third LC displays 203a, 203b and 203c for displaying individual images associated with different wavelength components.

As is shown in FIG. 10, laser beams of different wavelengths emitted from the first to third lasers 201a, 201b and 201c are uniformly expanded by the first to third beam expanders 202a, 202b and 202c.

A laser beam output from the third beam expander 202c is directly radiated on a third LC display 203c.

A laser beam output from the second beam expander 202b is reflected by a second flat mirror 1003b and then radiated on a second LC display 203b.

A laser beam output from the first beam expander 202a is reflected by a first flat mirror 1003a and then radiated on the first LC display 203a.

A first beam splitter 1001 is provided in a light path between the third LC display 203c and first lens 103 so that the Fraunhofer diffraction image displayed on the second LC display 203b and the Fraunhofer diffraction image displayed on the third LC display 203c may be synthesized. In addition, a second beam splitter 1002 is provided so that the Fraunhofer diffraction image displayed on the first LC display 203a and the Fraunhofer diffraction image displayed on the third LC display 203c may be synthesized. The first and second beam splitters 1001 and 1002 may be replaced with, for example, dichroic mirrors.

According to this structure, the Fraunhofer diffraction images displayed simultaneously on the first to third LC displays 203a, 203b and 203c are synthesized by the first and second beam splitters 1001 and 1002 and then projected on the screen 105 via the first and second lenses 103 and 104.

Specifically, according to this structure, a color image can be projected on the screen 105, without temporal limitations such as time response characteristics of the image display element.

In another method, for example, a color LC display element in which the respective pixels are provided with various color filters is used, and the LC display element is illuminated with light having a plurality of wavelength components. In this case, a sub-array is constituted by the pixels having the filters of the same wavelength component, and each sub-array produces a Fraunhofer diffraction image of the associated wave-length component. In addition, for example, an optical member such as an interference filter is inserted in a light source having a plurality of wavelength components or a wide wavelength band, e.g. an RGB laser or a white lamp, thereby to select a wavelength. Alternatively, the frequency of an applied high-frequency driving pulse is varied by a deflector such as an acoustooptical light modulation element, thereby to control the angle of diffraction and select the wavelength by passing the diffraction light through a pinhole or a slit.

A sixth embodiment of the projection type image display apparatus of the present invention will now be described with reference to FIG. 11. The structural elements common to those in the first and second embodiments are denoted by like reference numerals and a description thereof is omitted.

Figure 11:
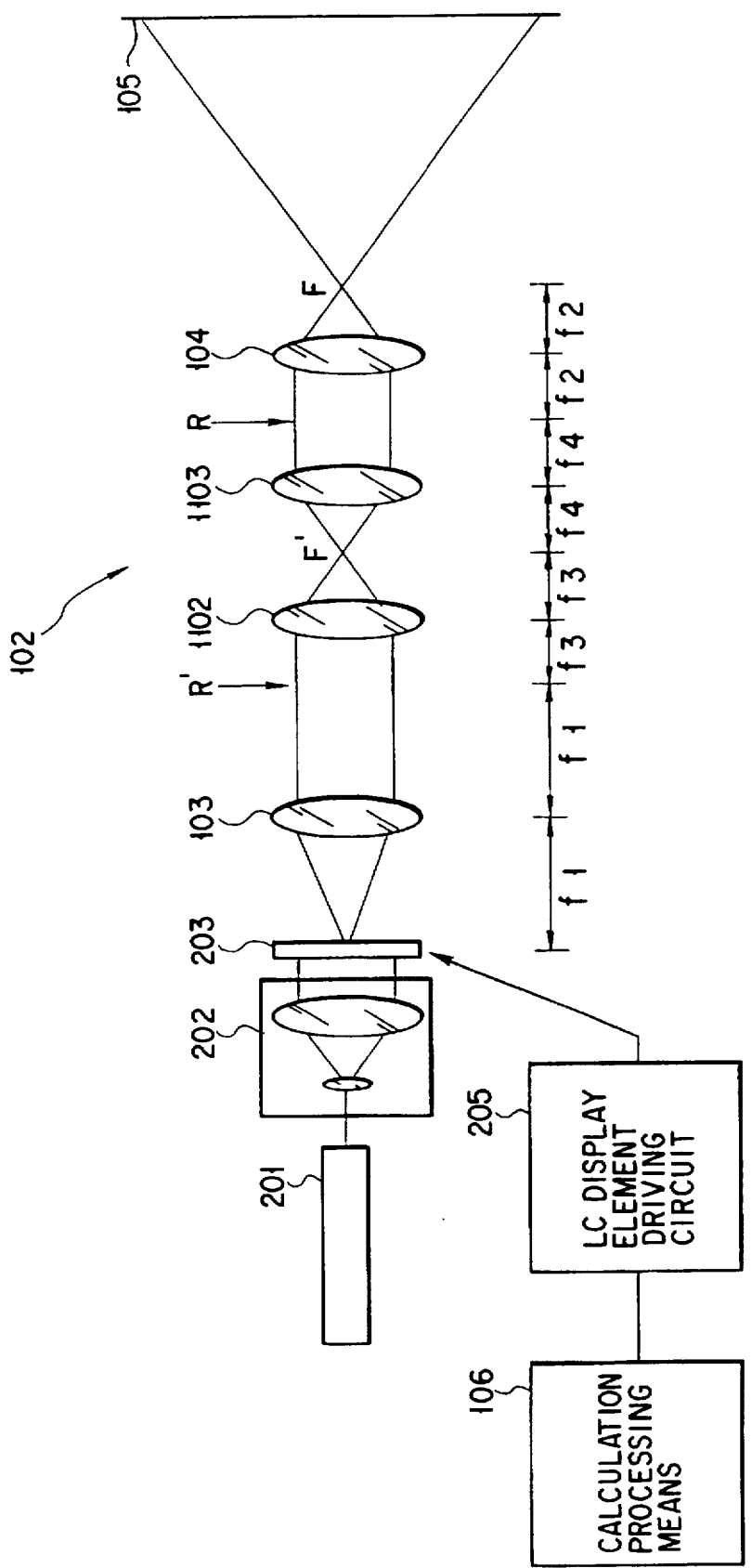
FIG. 11 shows schematically the structure of a projection type image display apparatus according to a sixth embodiment of the invention.

As is shown in FIG. 11, in the projection type image display apparatus of the present embodiment, a third lens 1102 (focal distance: $f_3$) and a fourth lens 1103 (focal distance: $f_4$) are provided in an optical path between the first lens 103 and second lens 104.

The third lens 1102 and fourth lens 1103 are arranged between the adjacent first lens 103 (focal distance: $f_1$) and second lens 104 (focal distance: $f_2$) so as to have a common focal point. The other structural features are common to those in the image display optical system as shown in FIG. 2.

In the above structure, a plane indicated by symbol F' (an image-side focal plane of the third lens 1102 or an object-side focal plane of the fourth lens 1103) is optically conjugate with the plane of the LC display 203 and the image-side focal plane of the second lens 104 indicated by symbol F. According to the present embodiment, therefore, even if the pixel densities of the first and second LC display elements (see FIGS. 3 and 4) applied to the first and second embodiments differ from each other, they can be made to coincide with each other by suitably selecting the refractive power of each of the first to fourth lenses 103, 104, 1102 and 1103 and matching the magnifications thereof. Furthermore, even if the pixel faces of the two LC display elements do not fall within the focal depth of the first lens 103, the two LC display elements may be situated in mutually conjugate positions so that focus can be made on any pixel face. In addition, the density distribution filter as disclosed in the third embodiment may be inserted.

By virtue of the third lens 1102 and fourth lens 1103, the plane indicated by R' (the image-side focal plane of the first lens 103 or the object-side focal plane of the third lens 1102) can be situated to be conjugate with the plane indicated by R (the image-side focal plane of the fourth lens 1103 or the object-side focal plane of the second lens 104).

Since in the two planes R' and R, the images produced by the LC display 203 are Fourier transformed, images equivalent to the original image are formed on the two planes R' and R.

As has been described above, one of the planes R and R' is normally provided with the mask 204 (see FIG. 2) having an opening, thereby determining the size and shape of the visual field of the image projected on the screen 105. Alternatively, various kinds of optical elements, masks or displays may be used to easily subject the projected image to various operations. For example, the projected image may be synthesized with an output image of another projection type image display apparatus by providing an optical member such as a beam splitter. Furthermore, the projected image may be synthesized with an output from a personal computer or a video apparatus by disposing an LC display on the plane R or plane R'.

As is shown in these examples, a new conjugate plane can be produced each time two lenses are added. Thus, by producing many conjugate planes, more complicated image processing can be performed.

Seventh and eighth embodiments of the projection type image display apparatus of the present invention will now be described with reference to FIGS. 12 and 13.

As is clear from the above-mentioned equation (6), in the structure as shown in FIG. 5, the amplitude and phase of the image formed on the screen 105 depend, for example, on a phase error $\theta_{mn}$ occurring while light is propagated from a given pixel position m on the LC display 203 to a given point n on the screen 105. Accordingly, in order to project a high-quality image on the screen 105, it is necessary to obtain information of the exact phase error $\theta_{mn}$. In order to obtain the exact phase error $\theta_{mn}$, it is sufficient to obtain position information on a given pixel position m on the LC display 203 and on a given point n on the screen 105, and distance information on a distance between the LC display 203 and screen 105. Since the LC display 203 and the plane F shown in FIG. 2 are situated in a conjugate positional relationship, the distance information is equivalent to distance information on a distance between the plane F and screen 105.

Normally, the information on the pixel position on the LC display 203 and on the position on the screen 105 on which an image is to be projected is already known when the apparatus is designed. However, it is not generally possible to obtain in advance the distance information on the distance between the LC display 203 and screen 105.

In order to overcome this drawback, the projection type image display apparatuses (see FIGS. 12 and 13) according to the seventh and eighth embodiments have been proposed.

As is shown in FIGS. 12 and 13, the projection type image display apparatus according to each of the seventh and eighth embodiments comprises an LC projector 1201 and a computer 1202.

According to this structure, image data of a Fraunhofer diffraction image calculated by the computer 1202 is transferred to the LC projector 1201. An LC display element driving circuit (e.g. LC display element driving circuit 205 shown in FIG. 11) is built in the LC projector 1201. The LC display element driving circuit pattern-controls the LC display (e.g. LC display 203 shown in FIG. 11) on the basis of transferred image data. The LC display is illuminated with a coherent light, and an image is projected and displayed on the screen 105 by image projecting means (image projecting means 102 shown in FIGS. 1 and 2).

FIG. 12 shows the structure of the projection type image display apparatus according to the seventh embodiment of the invention.

In the projection type image display apparatus of the present embodiment, the LC projector 1201 and screen 105 are coupled by a support member 1203 so that a predetermined distance is always kept between the LC display 203 and screen 105.

According to this structure, the phase error $\theta_{mn}$ can be listed on a table on the basis of the already known distance information. As a result, the calculation process can be performed quickly and easily and a high-quality image can be projected and displayed at all times.

FIG. 13 shows the structure of the projection type image display apparatus according to the eighth embodiment of the invention.

In the projection type image display apparatus of this embodiment, distance measuring means, e.g. a laser length measuring device 1301 is mounted on the LC projector 1201. The laser length measuring device 1301 is designed to optically measure the distance between the LC display 203 (or plane F shown in FIG. 2) and the screen 105.

A reflector 1302 is mounted on the screen 105. A light beam emitted from the laser length measuring device 1301 is reflected by the reflector 1302 and returned to the laser length measuring device 1301.

The reflector 1302 comprises, for example, a member such as a corner cube or a cat's eye, which can reflect light in 180 degree-opposite direction, irrespective of the direction of incidence of light, or a flat mirror if simplicity is considered.

Since the light emitted from the laser length measuring device 1301 has been high-frequency modulated, the distance between the laser length measuring device 1301 and the screen 105 can be measured by measuring a phase variation occurring while the light travels in opposite directions between the laser length measuring device 1301 and the screen 105.

Furthermore, the distance between the LC display 203 and screen 105 is measured by correcting a positional displacement between the LC display 203 (or plane F shown in FIG. 2) and the laser length measuring device 1301 on the basis of the measured result. The measured result or distance information is input to the computer 1202 and applied to calculate the phase error $\theta_{mn}$ in equation (12). Thereby, a high-quality image can be projected and displayed.

According to this structure, there is no need to integrate the LC projector 1201 and screen 105. Thus, the size and weight of the LC projector 1201 can be reduced, and the degree of freedom for installation and the usability can be increased.

As the length measuring means, the laser length measuring device 1301 may be replaced with length measuring means utilizing, for example, ultrasonic waves or other means. In addition, the distance between the length measuring means and the screen 105 or a variation in distance therebetween may be monitored and the monitored data may be applied to the calculation of a Fraunhofer diffraction image. Thereby, even when the screen 105 is moved in the direction of measurement of the laser length measuring device 1301, a high-quality image can always be projected and displayed at all times in accordance with the movement of the screen 105. As a result, the same advantage as with the autofocus function applied to general optical devices can be obtained. Furthermore, input means such as a keyboard, a mouse or a track ball of the computer 1202 may be used to manually input distance information, thereby to correct a projected image. Besides, it is possible to use such input means to effect fine adjustment of image correction, or to constitute a simple-structured projection type image display apparatus with input means substituted for the length measuring means.

Projection type image display apparatuses according to ninth and tenth embodiments of the invention will now be described with reference to FIGS. 14 to 17. The structural elements common to those in the seventh and eighth embodiments are denoted by like reference numerals and a description thereof is omitted.

In the seventh and eighth embodiments, it is presupposed that the screen 105 is exactly opposed to the LC projector 1201. In the ninth and tenth embodiments, however, the screen 105 may be opposed at an angle to the LC projector 1201. The single length measuring means in the seventh and eighth embodiments is replaced with inclination detecting means 1401.

FIG. 14 shows the structure of the projection type image display apparatus according to the ninth embodiment of the invention. The inclination detecting means 1401 comprises a plurality of length measuring means.

Specifically, two or more length measuring means are required to detect an inclination of the screen 105 about an axis included in the face of the screen 105. On the other hand, three or more length measuring means are required to detect an inclination of the screen 105 about two axes included in the face of the screen 105.

For example, when a laser length measuring device 1402 is used as length measuring means, as shown in FIG. 14, reflectors 1403 such as corner cubes or cat's eyes are arranged at specific positions on the screen 105. Light beams are emitted from the laser length measuring device 1402 to the individual reflectors 1403, thereby measuring the distance in each direction.

FIG. 14 shows the state in which light beams are emitted to three different points on the screen 105 and the distances between the length measuring means and each of those points are measured.

Inclination information of the screen 105 is calculated on the basis of the obtained three-directional distance information, and the position of each point on the screen 105 is found from the obtained distance information and inclination information with interpolation. The obtained position information of each point on the screen 105 is sent to the computer 1202 and applied to the calculation of the phase error $\theta_{mn}$ in equation (12). Thus, an appropriate Fraunhofer diffraction image can be calculated.

According to this structure, even when the screen 105 is inclined in relation to the LC projector 1201, a high-quality image can always be projected and displayed on the screen 105.

FIGS. 15 to 17 show the structure of a projection type image display apparatus according to the tenth embodiment of the present invention.

In the projection type image display apparatus of the tenth embodiment, the inclination detecting means comprises light output means for emitting light beams and an imaging unit for picking up an image of the light beams projected on the screen 105.

In FIG. 15, the light output means is constituted, for example, by three lasers 1501. However, it may be constituted by a single laser, an output beam of which may be optically divided.

In any case, the direction of emission of each optical beam is fixed with respect to the screen 105, and the angle of emission of each beam is a known one in the present system.

In FIG. 15, a CCD camera 1502 is used as the imaging unit.

With this structure, a reference point C is set at a center of a region defined by three light spots α, β and γ, as shown in FIG. 16. As the distance between the CCD camera 1502 and the screen 105 increases, the distances among the three light spots α, β and γ will increase (see light spots α', β' and γ') at the same ratio at all times.

Accordingly, the distance between the CCD camera 1502 and the screen 105 can be measured by measuring the distances between the reference point C and light spots α', β' and γ'.

FIG. 17 shows the state in which the screen 105 is situated at an angle to the LC projector 1201 (see FIG. 15). For the purpose of simplicity, FIG. 17 shows the state in which the screen 105 is rotated about a vertical axis.

In this case, the distance between the reference point C and light spot γ" does not change, but the distance between the reference point C and light spot α" decreases and the distance between the reference point C and light spot β" increases.

Accordingly, the amount of inclination of the face of screen 105 can be measured from the variation in distance between the reference point C and each light spot.

The position of each light spot is imaged by, e.g. the CCD camera 1502, and the position of each light spot is found on the basis of the pixel position of the CCD element corresponding to the image of each light spot. Based on the obtained position information of the light spots, the information on the inclination of the screen 105 and on the distance between the CCD camera 1502 and the screen 105 is calculated. On the basis of the calculated information, the position of each point on the screen 105 is found by means of interpolation. The obtained position information of each point on the screen 105 is sent to the computer 1202 and applied to the calculation of the phase error $\theta_{mn}$ in equation (12). Thus, an appropriate Fraunhofer diffraction image can be calculated.

According to this structure, even when the screen 105 is inclined to the LC projector 1201, a high-quality image can always be projected and displayed on the screen 105.

Projection type image display apparatuses according to eleventh to 13th embodiments of the invention will now be described with reference to FIGS. 18 to 20. The structural elements common to those in the first and second embodiments are denoted by like reference numerals and a description thereof is omitted.

The projection type image display apparatuses according to these embodiments are characterized in that a projected image is moved relative to the screen 105 or an image is exactly projected on the screen 105 which is moving in the direction of a double-headed arrow T.

Figure 18:
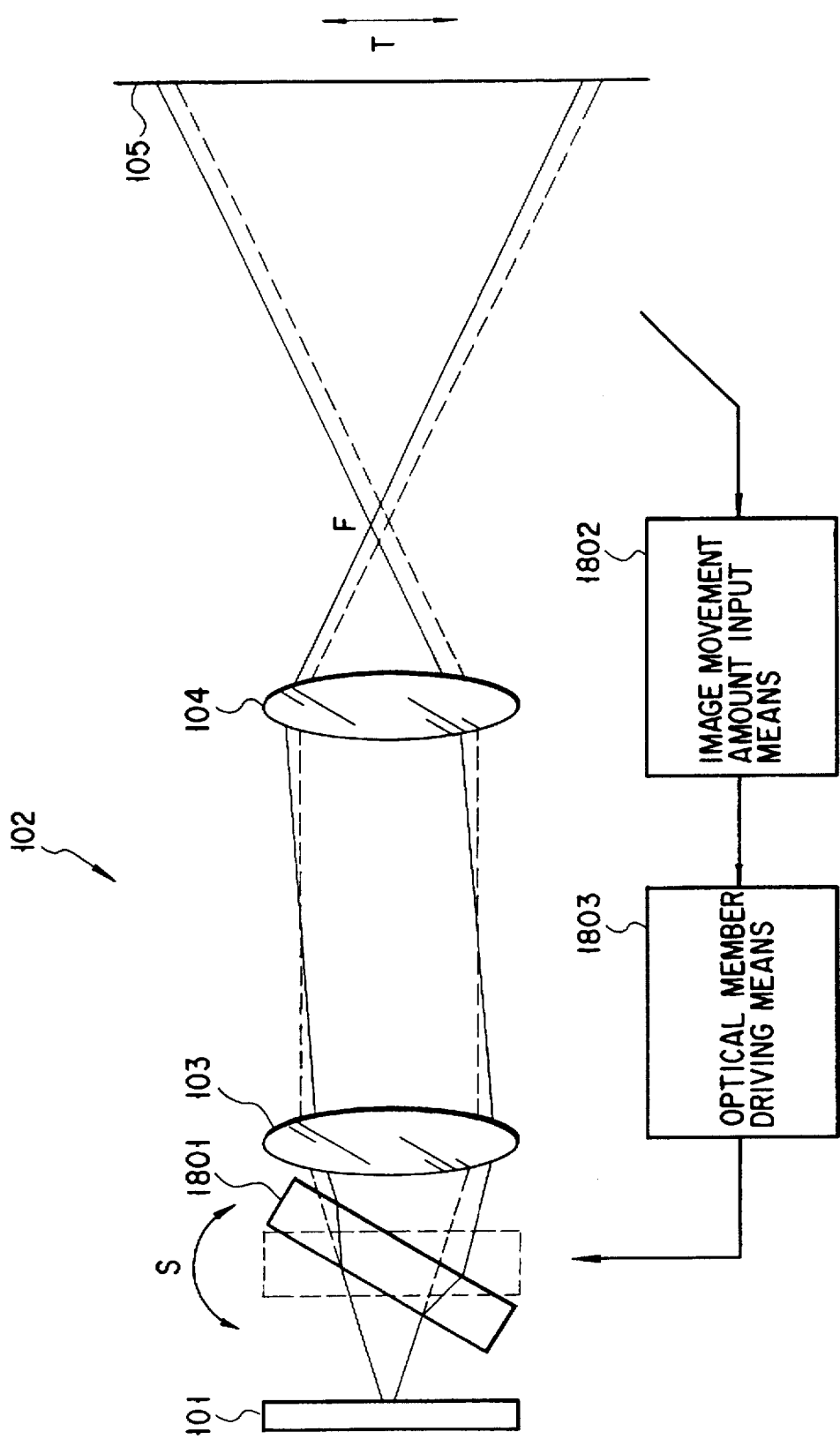
FIG. 18 shows schematically the structure of a projection type image display apparatus according to an eleventh embodiment of the invention.

FIG. 18 shows the structure of the projection type image display apparatus according to the eleventh embodiment of the present invention.

As is shown in FIG. 18, an image projecting means 102 applied to this embodiment includes an image movement amount input means 1802 for inputting the amount of movement of a projection image on the screen 105, and projection image movement means for controlling the position of a projected original image on the screen 105 on the basis of data input to the image movement amount input means 1802. The projection image moving means comprises an optical member (e.g. glass plate) 1801, which is inclined or rotated with respect to the optical axis to shift the light beam in parallel, and an optical member driving means 1803 for rotating the optical member 1801 in a predetermined direction by a predetermined amount on the basis of data input to the image movement amount input means 1802.

The optical member 1801 is situated between the image display means 101 and the first lens 103. By rotating the optical member 1801 in the direction of a double-headed arrow S, a Fraunhofer diffraction image produced and displayed on the image display means 101 can be shifted in parallel in the image-side focal plane (indicated by symbol F) of the second lens 104.

When the refractive index of the optical member 1801 is n, the thickness of the optical member 1801 is d and the angle of inclination of the optical member 1801 is θ, a parallel movement amount x in plane F is given by $$x = \frac{f_2}{f_1} d \sin\theta \left\{ 1 - \frac{\cos\theta}{\sqrt{n^2 - \sin^2\theta}} \right\}$$

where $f_1$ and $f_2$ are focal distances of the first lens 103 and second lens 104.

In FIG. 18, the optical member 1801 is situated between the image display means 101 and first lens 103. However, the optical member 1801 may be situated, for example, between the second lens 104 and screen 105, with the same operational advantage achieved.

The Fraunhofer diffraction image produced and displayed on the image display means 101 can be shifted in parallel two-dimensionally by providing the optical member 1801 with two rotational axes (not shown) intersecting at right angles and rotating the optical member 1801 by means of one of various types of motors or a galvanometer.

The direction and amount of rotation of the optical member 1801 are determined on the basis of movement amount data input to the image movement amount input means 1802. For example, the movement amount data on the projection image may be input by using data input means such as a keyboard, a mouse or a track ball. In addition, the amount of movement of the screen 105 may be detected by using the inclination detecting means 1401 as shown in FIGS. 14 and 15, and the obtained movement amount data may be input to the image movement amount input means 1802.

In any case, the direction and amount of rotation of the optical member 1801 are determined on the basis of the input data, i.e. movement amount data, and the optical member driving means 1803 drives the optical member 1801 on the basis of the movement amount data. As a result, the Fraunhofer diffraction image produced and displayed on the image display means 101 is shifted in parallel by the aforementioned image moving means, and the original image produced on the screen 105 is shifted on the face of the screen 105 accordingly.

As has been described above, according to the present embodiment, the relative position of the projection image to the screen 105 can easily be changed without moving the body of the projection type image display apparatus. Furthermore, the image can always be projected and displayed at a specified position on the screen 105 in accordance with the movement of the screen 105.

Figure 19:
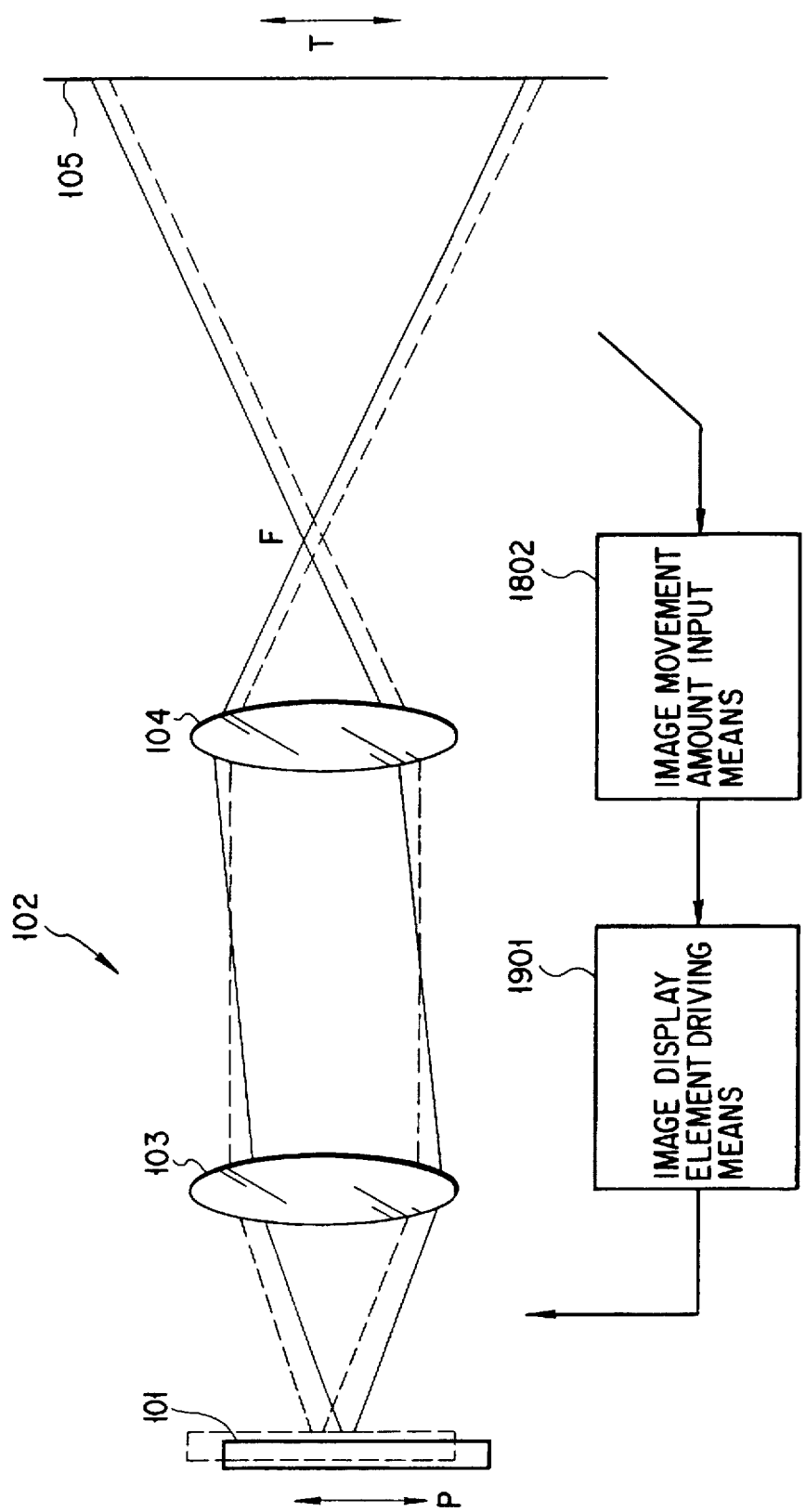
FIG. 19 shows schematically the structure of a projection type image display apparatus according to a twelfth embodiment of the invention.

FIG. 19 shows the structure of the projection type image display apparatus according to the twelfth embodiment of the invention. The structural elements common to those in the eleventh embodiment are denoted by like reference numerals and a description thereof is omitted.

As is shown in FIG. 19, the projection type image display apparatus of the present embodiment includes an image movement amount input means 1802 to which movement amount data on the projection image is input, and image display element driving means 1901 for moving the image display means 101 in the direction of a double-headed arrow P on the basis of the movement amount data input to the image movement amount input means 1802.

In the present embodiment, the image display means 101 is constructed such that an image display element is mounted on a two-axis stage (not shown) such as an x-y stage. On the basis of the input movement amount data, the image movement amount input means 1802 determines the direction and amount of movement of the two-axis stage. Based on the determined direction and amount of movement, the image display element driving means 1901 moves the image display means 101 in the direction of double-headed arrow P. As a result, the display position of the projected image on the screen 105 can be controlled.

For example, in the case where the projection image is continuously displayed on the screen 105 moving in the direction of double-headed arrow T, if it is detected that the screen 105 has moved to the upper region in FIG. 19, the image movement amount input means 1802 calculates the direction and amount of movement of the two-axis stage so that the Fraunhofer diffraction image produced and displayed on the image display means 101 may be exactly projected on the screen 105. On the basis of the calculated data, the image display element driving means 1901 moves the image display means 101 downward in FIG. 19 by a predetermined amount. As a result, the projected original image is shifted in the plane of the screen 105 which is moving.

As has been described above, according to the present embodiment, the relative position of the projection image on the screen 105 can easily be changed without moving the body of the projection type image display apparatus. Furthermore, the image can always be projected at a specific position on the screen 105 which is moving. In addition, in a coherent optical system, a problem is posed by the influence of interference noise occurring when light is reflected among optical parts. According to the present embodiment, however, the optical member 1801 can be dispensed with (see FIG. 18) and therefore the influence of interference noise can be eliminated.

Figure 20:
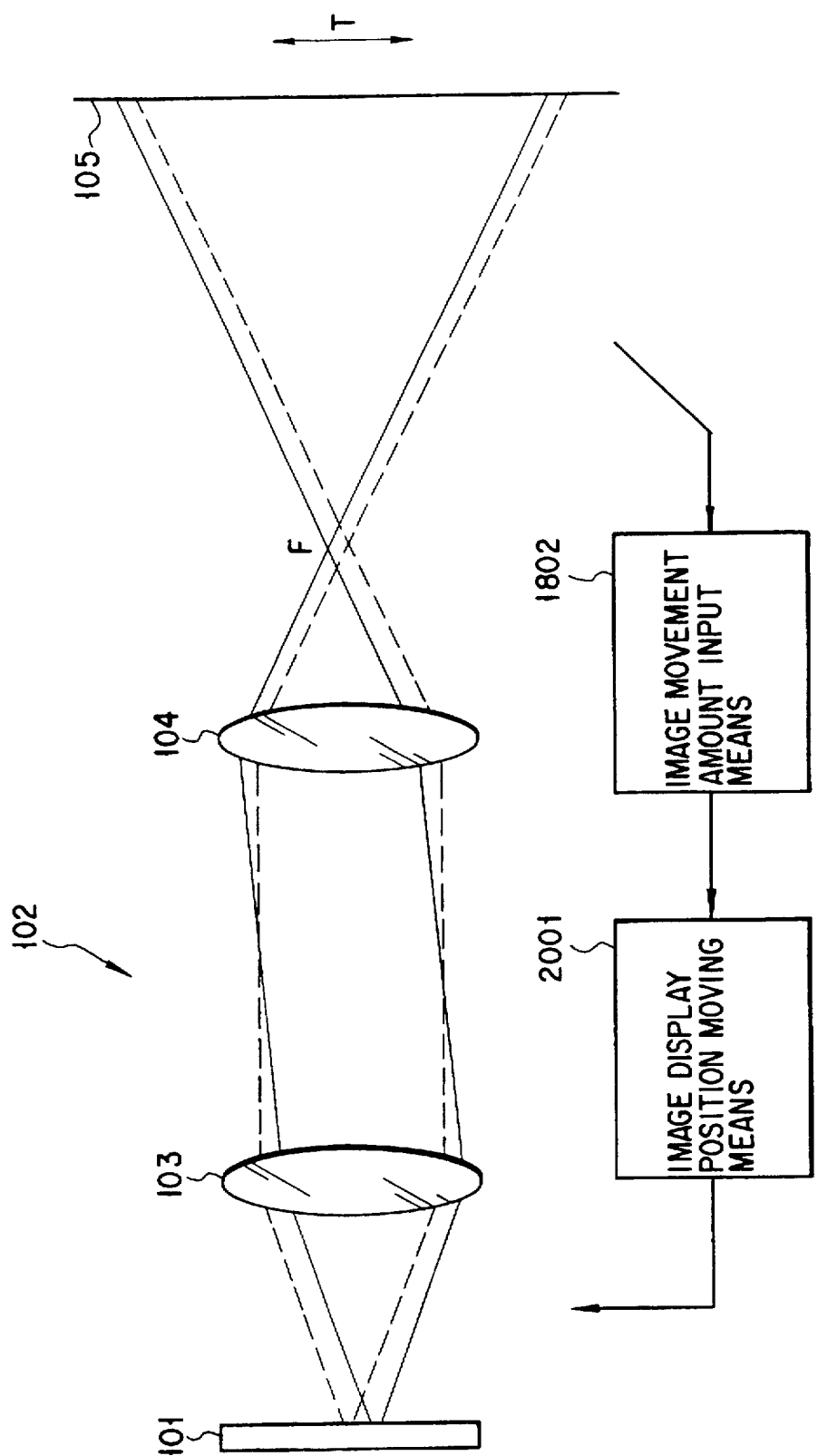
FIG. 20 shows schematically the structure of a projection type image display apparatus according to a 13th embodiment of the invention.

FIG. 20 shows the structure of the projection type image display apparatus according to the 13th embodiment of the invention. The structural elements common to those in the eleventh and twelfth embodiments are denoted by like reference numerals and a description thereof is omitted.

As is shown in FIG. 20, the projection type image display apparatus of the present embodiment includes an image movement amount input means 1802 to which movement amount data on the projection image is input, and image display position moving means 2001 for moving the position, at which the Fraunhofer diffraction image is produced and displayed, within the image display means 101 on the basis of the movement amount data input to the image movement amount input means 1802.

In the present embodiment, the image display means 101 is not moved, but the Fraunhofer diffraction image itself, which is produced and displayed on the image display means 101, is moved.

The direction and amount of movement of the Fraunhofer diffraction image are determined on the basis of the movement amount data input to the image movement amount input means 1802. On the basis of the movement amount data, the image display position moving means 2001 moves the Fraunhofer diffraction image produced and displayed on the image display means 101 so that the original image is projected at a predetermined position on the screen 105.

For example, in the case where the projection image is continuously projected on the screen 105 moving in the direction of arrow T, if it is detected that the screen 105 has moved to the upper region in FIG. 20, the image movement amount input means 1802 calculates the direction and amount of movement of the Fraunhofer diffraction image so that the Fraunhofer diffraction image produced and displayed on the image display means 101 may be converted to the original image and projected on the screen 105. On the basis of the calculated data, the image display position moving means 2001 moves the Fraunhofer diffraction image downward in FIG. 20 by a predetermined amount. As a result, the projected original image is shifted in the plane of the screen 105 which is moving.

As has been described above, according to the present embodiment, the relative position of the projection image on the screen 105 can easily be changed without moving the body of the projection type image display apparatus. Furthermore, the image can always be projected at a specific position on the screen 105 which is moving.

Furthermore, according to the present embodiment, the position of the projection image can be controlled by software without using a driving system. Therefore, the structure of the apparatus can be simplified and the size and weight of the apparatus can be reduced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A projection type image display apparatus comprising:
   a diffraction image display unit for performing at least one of operations of producing and displaying a Fraunhofer diffraction image of an original image; and
   an image projecting unit for converting said Fraunhofer diffraction image to the original image and projecting the original image obtained by conversion on a screen;
   wherein said diffraction image display unit comprises:
      a calculation processing unit for non-recursively and synthetically calculating amplitude information and phase information of said Fraunhofer diffraction image of the original image; and
      an image display unit for performing at least one of said operations of producing and displaying said Fraunhofer diffraction image in accordance with the amplitude information and phase information calculated by said calculation processing unit;
   said calculation processing unit comprising a synthetic data calculating unit for obtaining synthetic data on a display face of said image display unit and a complex conjugate calculating unit for finding a complex conjugate of an output from said synthetic data calculating unit, in a case where spherical waves are projected from points of an image to be projected on said screen on the display face of said image display unit.

2. The projection type image display apparatus according to claim 1, wherein said image display unit includes an image display element arranged two-dimensionally to emit mutually coherent light beams.

3. The projection type image display apparatus according to claim 1, wherein said image display unit includes an image display element having pixels arranged two-dimensionally, and a light source for radiating a coherent light beam to said image display element.

4. The projection type image display apparatus according to claim 1, wherein said image display unit includes an amplitude information control unit for controlling amplitude information of said Fraunhofer diffraction image, and a phase information control unit for controlling phase information of said Fraunhofer diffraction image.

5. The projection type image display apparatus according to claim 4, wherein said phase information control unit includes a liquid crystal element for controlling phase information of said Fraunhofer diffraction image by controlling a birefringence of each pixel.

6. The projection type image display apparatus according to claim 4, wherein said phase information control unit includes a liquid crystal element for controlling a direction of polarization for each pixel, a ¼ wavelength plate for receiving a light beam from said liquid crystal element and providing a π/2 phase difference between different polarized components, and a polarizer for passing a given one of the different polarized components of the light beam emanating from said ¼ wavelength plate which is polarized in a predetermined direction.

7. The projection type image display apparatus according to claim 1, wherein said image display unit comprises a light amount distribution control unit for controlling a spatial distribution of amplitude of the image displayed on said image display unit, and an image converting unit for converting the image displayed on said image display unit on the basis of the spatial distribution controlled by said light amount distribution control unit.

8. The projection type image display apparatus according to claim 7, wherein said light amount distribution control unit comprises a density filter having a light transmittance which decreases toward a peripheral portion thereof.

9. The projection type image display apparatus according to claim 1, wherein said image projecting unit includes a light amount distribution control unit for controlling a spatial distribution of amplitude of an image to be converted and projected on said image projecting unit, and said diffraction image display unit includes an image converting unit for converting the image displayed on the diffraction image display unit, on the basis of the spatial distribution controlled by said light amount distribution control unit.

10. The projection type image display apparatus according to claim 9, wherein said light amount distribution control unit comprises a density filter having a light transmittance which decreases toward a peripheral portion thereof.

11. The projection type image display apparatus according to claim 1, wherein said image display unit includes a microlens array having substantially identical focal points on the image display face of said image display unit.

12. The projection type image display apparatus according to claim 1, wherein said image display unit includes a coherent light source having at least three wavelengths selected from a visible wavelength region, an operating unit for performing at least one of said operations of producing and displaying a Fraunhofer diffraction image of an image relating to each of the wavelengths, and a synthesizing unit for synthesizing said Fraunhofer diffraction image of said original image.

13. The projection type image display apparatus according to claim 12, wherein said image display unit includes a control unit for causing Fraunhofer diffraction images of images corresponding to at least three wavelength components selected from a visible wavelength region to be successively presented and displayed.

14. The projection type image display apparatus according to claim 1, wherein said image display unit includes a synthesizing unit for simultaneously presenting and synthesizing Fraunhofer diffraction images of images corresponding to at least three wavelength components selected from a visible wavelength region.

15. The projection type image display apparatus according to claim 14, wherein said synthesizing unit includes a color liquid crystal display in which color pixels are arranged two-dimensionally.

16. The projection type image display apparatus according to claim 1, wherein said image projecting unit includes a synthesizing unit for synthesizing an image produced by a second optical system, at a position conjugate with said screen.

17. The projection type image display apparatus according to claim 1, wherein said calculation processing unit includes a projection image correcting unit for correcting amplitude information and phase information of said Fraunhofer diffraction image, on the basis of a positional relationship between said image display unit and said screen.

18. The projection type image display apparatus according to claim 17, wherein said projection image correcting unit includes a distance adjusting unit for keeping constant a distance between said image display unit and said screen.

19. The projection type image display apparatus according to claim 17, wherein said projection image correcting unit includes a length measuring unit for optically measuring a distance between said image display unit and said screen.

20. The projection type image display apparatus according to claim 17, wherein said projection image correcting unit includes a length measuring unit for measuring distances between said image display unit and a plurality of locations on said screen.

21. The projection type image display apparatus according to claim 17, wherein said projection image correcting unit includes an inclination detecting unit for measuring a distance between said image display unit and said screen and an inclination of said screen.

22. The projection type image display apparatus according to claim 1, wherein said image projecting unit includes an image movement amount input unit to which a movement amount of said screen is input, and a projection image movement unit for controlling a projection position of the original image projected on said screen on the basis of data input to said image movement amount input unit.

23. The projection type image display apparatus according to claim 22, wherein said projection image moving unit includes an optical member constructed to be one of inclined and rotated with respect to an optical axis of the apparatus to move a light beam in parallel, and an optical member driving unit for driving said optical member.

24. The projection type image display apparatus according to claim 22, wherein said projection image moving unit includes a driving unit for driving the diffraction image display unit for moving said diffraction image display unit in a predetermined direction, on the basis of movement amount data input to said image movement amount input unit.

25. The projection type image display apparatus according to claim 22, wherein said projection image moving unit includes an image display position moving unit for moving said Fraunhofer diffraction image within said diffraction image display unit on the basis of movement amount data input to said image movement amount input unit.

26. The projection type image display apparatus according to claim 1, wherein said calculation processing unit comprises an amplitude distribution calculating unit for calculating an amplitude distribution by finding a square root of an intensity distribution of the image to be projected on the screen.

27. The projection type image display apparatus according to claim 1, wherein the synthetic data calculating unit calculates the image to be produced on said image display unit by executing a calculation represented by:

$$A_m \exp[-j(\Phi_m)] = \sum_{n=1}^{N} \alpha_n \exp[-j(\theta_{mn} + \phi_n)],$$

where an amplitude is $\alpha_n$ and a phase is $\phi_n$ at a given point n on the screen, and an amplitude is $A_m$ and a phase is $\Phi_m$ at an m-th pixel when said image display unit comprises M-number of pixels, and a phase error is $\theta_{mn}$.

* * * * *